(12) United States Patent
Niimi et al.

(10) Patent No.: US 10,752,325 B2
(45) Date of Patent: Aug. 25, 2020

(54) FLOAT, FLOAT ASSEMBLY, AND METHOD FOR INSTALLING FLOAT ASSEMBLY

(71) Applicant: KYORAKU CO., LTD., Kyoto (JP)

(72) Inventors: Takaya Niimi, Tokyo (JP); Yoshinori Motohashi, Osaka (JP); Tsutomu Sakaguchi, Osaka (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 16/313,994

(22) PCT Filed: Jun. 30, 2017

(86) PCT No.: PCT/JP2017/024113
§ 371 (c)(1),
(2) Date: Dec. 28, 2018

(87) PCT Pub. No.: WO2018/003966
PCT Pub. Date: Jan. 4, 2018

(65) Prior Publication Data
US 2019/0168848 A1     Jun. 6, 2019

(30) Foreign Application Priority Data

Jun. 30, 2016 (JP) ................................ 2016-130782
Jul. 29, 2016 (JP) ................................ 2016-150680
(Continued)

(51) Int. Cl.
*B63B 35/44*     (2006.01)
*H02S 10/40*     (2014.01)
(Continued)

(52) U.S. Cl.
CPC .............. *B63B 35/44* (2013.01); *B63B 35/38* (2013.01); *F24S 20/70* (2018.05); *F24S 25/11* (2018.05);
(Continued)

(58) Field of Classification Search
CPC ......... B63B 35/00; B63B 35/44; B63B 35/58; B63B 38/00; B63B 2035/00;
(Continued)

(56) References Cited

U.S. PATENT DOCUMENTS 10,396,703 B2 * 8/2019 Niimi ..................... B63B 35/44
2014/0224165 A1   8/2014 Zijlmans et al.
(Continued)

FOREIGN PATENT DOCUMENTS

JP     2014-511043 A     5/2014
JP     2015-217771 A     12/2015
(Continued)

OTHER PUBLICATIONS

International Search Report dated Sep. 26, 2017 of corresponding International Application No. PCT/JP2017/024113; 9 pages.

*Primary Examiner* — Daniel V Venne
(74) *Attorney, Agent, or Firm* — Maier & Maier, PLLC

(57) ABSTRACT

The present invention provides a float capable of suppressing deformation of the synthetic resin body even if internal gas expands and contracts due to environmental temperature change. A float 10 comprises a float body 20 made of a synthetic resin molded in a hollow shape, a projecting portion 202 projecting from the upper surface of the float body 20 and having a vent hole 201, and a microporous membrane 203 adhered to the outside of the vent hole 201.

12 Claims, 18 Drawing Sheets

(30) Foreign Application Priority Data

Jul. 29, 2016 (JP) ................................ 2016-150681
Jul. 29, 2016 (JP) ................................ 2016-150683
Dec. 28, 2016 (JP) ................................ 2016-257014

(51) Int. Cl.
| | |
|---|---|
| *F24S 25/634* | (2018.01) |
| *F24S 25/65* | (2018.01) |
| *F24S 25/63* | (2018.01) |
| *B63B 35/38* | (2006.01) |
| *H02S 20/30* | (2014.01) |
| *F24S 25/11* | (2018.01) |
| *F24S 25/636* | (2018.01) |
| *F24S 20/70* | (2018.01) |
| *F24S 25/632* | (2018.01) |
| *F24S 25/60* | (2018.01) |

(52) U.S. Cl.
CPC ............. *F24S 25/63* (2018.05); *F24S 25/632* (2018.05); *F24S 25/634* (2018.05); *F24S 25/636* (2018.05); *F24S 25/65* (2018.05); *H02S 10/40* (2014.12); *H02S 20/30* (2014.12); *B63B 2035/4453* (2013.01); *F24S 2025/6001* (2018.05)

(58) Field of Classification Search
CPC ........ B63B 2035/44; B63B 2035/4433; B63B 2035/4453; H02S 10/40
USPC ............................ 114/264, 266, 267; 441/35
See application file for complete search history.

(56) References Cited

U.S. PATENT DOCUMENTS

2017/0085214 A1    3/2017  Niimi
2019/0341877 A1*  11/2019  Niimi ..................... H02S 10/40

FOREIGN PATENT DOCUMENTS

| KR | 10-1481093 B1 | 1/2015 |
|---|---|---|
| WO | 2015/174205 A1 | 11/2015 |

\* cited by examiner

FLOAT, FLOAT ASSEMBLY, AND METHOD FOR INSTALLING FLOAT ASSEMBLY

TECHNICAL FIELD

The present invention relates to a float for the solar panel, a float assembly connecting the floats, and a method of arranging the float assembly.

BACKGROUND ART

In solar power generation that converts sunlight into electric power, the solar panel (solar cell panel, also called solar cell module) is used.

Until now, the solar panel has been installed mainly on roofs and walls of buildings and grounds. Recently, it has also been installed on the water such as idle ponds and lakes.

When installing the solar panel on water, a float for floating the solar panel on water is used, and the solar panel is installed on the float (See Patent Literatures 1 and 2).

CITATION LIST

Patent Literature

[Patent Literature 1] Japanese Translation of PCT International Application Publication No. JP-T-2014-511043
[Patent Literature 2] Japanese Unexamined Patent Application Publication No. 2015-217771

SUMMARY OF INVENTION

Technical Problem

First Aspect

The float is formed as a hollow forming body made of resin having gas (air, and so on) inside so as to obtain buoyancy for floating the solar panel on the water.

And since the float is installed in a sunny place so that sunlight is irradiated on the solar panel well, the sunlight expands the gas in the float.

Then, the float itself also expands with the expansion of the gas in the float.

On the other hand, at night, as the temperature drops, the expanded gas shrinks and the expanded float accordingly contracts.

In the longer cycle, the float causes the expansion and the contraction even under an influence of temperature difference between summer and winter.

Therefore, the float itself repeats expanding and contracting on a daily basis. For example, the rigidity of a part attaching the solar panel of the float is increased or the part attaching the solar panel of the float is provided with a mounting metal fixture. Therefore, the rigidity of this part is higher than that of the other parts, and the followability to the expansion and contraction of the float is poor in this part.

Therefore, the stress are likely to concentrate in this part where the solar panel is to be attached, the deformation may occur in this part to which the solar panel is to be attached, and the attachment between this part and the solar panel may loosen.

The first aspect of the present invention has been made in view of the foregoing, and an object thereof is to provide a resin float for a solar panel that is able to suppress occurrence of expansion and contraction.

Second Aspect

In Patent Literature 1, an elastomer fixing portion is used in order to fix the solar panel to the float. The elastomer fixing portion has a groove for clamping the frame of the solar panel and the frame is elastically clamped by inserting the edge of the frame into the groove.

On the other hand, for example, works of installing the solar panel and maintenance are carried out in a state in which the float is floating on water. Then, the float is made of resin having gas (air, and so on) inside in order to obtain buoyancy. Therefore, the deflection of the float may occur when the worker gets on the float for installation and maintenance work of the solar panel.

For the deflection, the stress may be applied in a direction such that the clamping of the solar panel is released, and the solar panel may come off the float. The direction corresponds to a direction in which the groove extends.

In addition, even when a force is applied in a direction in which the solar panel floats due to strong wind, the stress may be applied in the direction such that the clamping of the solar panel is released, and the solar panel may come off the float. The direction corresponds to a direction in which the groove extends. Therefore, the float that can fix the solar panel more stably is desired.

The second aspect of the present invention has been made in view of the foregoing, and an object thereof is to provide a resin float that can stably fix the solar panel and a method of manufacturing the float.

Third Aspect

An assembly float portion whose overall shape is rectangular is obtained by connecting one of the four corners of the float and one of the four corners of the connecting element. Then, in this assembly float portion, the fixing ears remain only at the four corners of the assembly float portion.

In the case where the anchor ropes are fixed to the fixing ear so that the assembly float portion does not move over the water, there are only four fixing ears remaining at the four corners of the assembly float portion. Therefore, the anchor ropes are fixed to the four fixing ears remaining at the four corners.

And when the assembly float portion moves due to the wind, a force to hold the assembly float portion is to be applied to the anchor ropes and the fixing ears to which the anchor ropes are connected. And the force to hold the assembly float portion increases as the number of the float increases and the assembly float portion becomes larger.

On the other hand, in order to increase the amount of power generation, it is necessary to have a large number of the solar panels installed. To support a large number of the solar panels, a lot of floats are needed. An increasing of the float results in, when the assembly float portion moves due to the wind, breakage of the anchor ropes and the fixing ears.

In a state where the anchor ropes are fixed only at the four corners of the assembly float portion, when breakage occurs in two of the anchor ropes or the fixing ears to which two of the anchor ropes are connected, it is difficult to moor the assembly float portion in a fixed position.

In the case where the anchor ropes are fixed to four fixed portions of the assembly float portion, each of the four fixed portions shares 25% of a total force to hold the assembly float portion in the fixed position. The fixed portion corresponds to the anchor rope and the fixed ear. Then, one of the four fixed portions is damaged, each of three fixed portions shares 33% of the total force to hold the assembly float portion in the fixed position, and the force applied to the anchor ropes or the fixing ears increase.

Therefore, when the number of the fixed portions reaches three as one of the four fixed portions is damaged, the probability that the remaining fixed portion are damaged greatly increases. The user are concerned about steadily mooring of the assembly float portion, and it is desirable that the assembly float portion can be moored more stably.

Also, depending on the terrain (for example, the topography of the bottom of a pond or a lake) on which the assembly float portion is installed, it may not be appropriate to connect the anchor rope to the four corners of the assembly float portion.

Therefore, the assembly float portion is also desired to have a lot of a place where the anchor rope can be connected.

The third aspect of the present invention has been made in view of the foregoing, and an object thereof is to provide a resin float for a solar panel that an assembly float portion can have a lot of mooring places where a mooring component such as the anchor rope can be connected and to provide a resin float for a solar panel that can constitute the assembly float portion that can be moored steadily.

Fourth Aspect

The electricity generated by the solar panel is not consumed on facilities installed on the pond or the lake. Thus, the solar panel installed on the water and onshore facilities (power storage facilities and power transmission facilities) are connected with a power cable. Hereinafter the power cable is referred to as the cable.

In this case, installers can lay the cable, along the bottom of the pond and the lake, from the solar panel side installed on the water to the land.

The reason for laying in this way is to prevent the cable from being damaged with aged deterioration due to its own weight. It is similar to what is done in the undersea cable.

However, a length of the cable along the bottom of the pond and the lake is longer than a cable connecting from the solar panel side installed on the water to the facilities on the land by a straight line.

Moreover, if the cable is laid underwater, maintenance burden of the cable increases.

The fourth aspect of the present invention has been made in view of the foregoing, and an object thereof is to provide a float assembly capable of reducing the length of the cable and reducing the maintenance burden of the cable.

Fifth Aspect

In the photovoltaic power generation, a direction of the solar panel is important. The solar panel tracks the sun so that the direction of the solar panel faces the sun, which greatly increases power generation efficiency. Therefore, a photovoltaic power generation system having a solar tracking mechanism has been studied in various fields. However, many of these systems are large-scaled and require considerable capital investment. In addition, these systems consume a large amount of generated electric power for sun tracking, and there is also a problem that it is not always possible to sufficiently improve power generation efficiency.

The present invention has been made in view of the foregoing, and an object thereof is to provide a photovoltaic power generation device that is capable of solar tracking while having a simple configuration, does not require much capital investment, and is capable of suppressing power consumption for solar tracking.

The first aspect of the present invention provides a resin float for a solar panel, comprising: an annular float portion formed to be hollow, and a recess including a peripheral wall provided in the annular float portion. The resin float comprising a back wall and a front wall, the recess is formed by recessing the back wall toward a side of the front wall so that the recess is configured to accommodate air, and at least a part of the back wall is integrated with the front wall in the recess.

The first aspect of the present invention provides a resin float for a solar panel that is able to suppress occurrence of expansion and contraction.

Various embodiments of the present invention are described below. The embodiments below can be combined with each other.

Preferably, the resin float comprises a supporting portion configured to support the solar panel, the supporting portion formed by combining the back wall and the front wall. The supporting portion is configured to be raised toward the side of the front wall with a side of the supporting portion as a hinge so as to form an opening of the annular float portion, the side of the supporting portion being connected to an inner wall of the opening of the annular float portion. The recess is provided in a part of the annular float portion, the part of the annular float portion positioned on a side opposite to the supporting portion in a raised state, the part of the annular float portion sandwiching the opening of the annular float portion with the supporting portion.

Preferably, the recess includes truncated conical recess portions which taper toward the front wall, the truncated conical recess provided at both ends and a center of the recess along the supporting portion respectively, and a groove-shaped recess portion which narrows toward the side of front wall, the groove-shaped recess connecting the truncated conical recess portions in a direction along the supporting portion. The back wall and the front wall are integrated in a tip of the truncated conical recess portions, and the back wall and the front wall are not integrated in the groove-shaped recess portion.

Preferably, the front wall includes a sloping portion provided from a position adjacent to an end, opposite to an opening, of the recess toward a side away from the recess, the sloping portion being configured so that a distance to the back wall gradually decreases toward the side away from the recess, a receiving portion configured to receive an end portion of the solar panel, the receiving portion provided to rise from an end, opposite to the recess, of the sloping portion.

Preferably, the front wall is provided with a groove, the groove formed at least from a position in the recess to the sloping portion, and a tip, on a side of the sloping portion, of the groove being connected to the sloping portion with substantially no step.

The second aspect of the present invention provides a resin float for a solar panel, comprising: a first side metal fixture configured to fix a first side of the solar panel, and a mounting portion provided in a first side of the resin float and having the first side metal fixture attached thereon. The first side metal fixture includes a lower metal fixture, a first side of the lower metal fixture is fixed to the mounting portion, at least a second side of the lower metal fixture is disposed under the solar panel, the lower metal fixture is engaged with or fixed to the solar panel.

The second aspect of the present invention provides a resin float that can stably fix the solar panel and a method of manufacturing the float.

Various embodiments of the present invention are described below. The embodiments below can be combined with each other.

Preferably, the resin float comprises a screw configured to fix the first side metal fixture to the mounting portion. The first side metal fixture includes an upper metal fixture, a second side of the upper metal fixture is arranged above the solar panel and a first side of the upper metal fixture is fixed to the mounting portion. The second side of the upper metal fixture configured to clamp the solar panel between the upper metal fixture and the lower metal fixture so that the second side of the upper metal fixture presses the solar panel toward a side of the lower metal fixture, and the first side end side of the upper metal fixture and the first side of the lower metal fixture are fixed together to the mounting portion with the screw.

Preferably, the lower metal fixture having a second side provided with a U-shaped hook portion, the lower metal fixture is engaged with the solar panel by engaging the hook portion with an engaging portion provided in the solar panel.

Preferably, a resin float for a solar panel, comprising: a receiving portion configured to receive a first side of the solar panel, the receiving portion provided in a first side of the resin float, and a mounting portion provided in the first side of the resin float, the mounting portion provided in a vicinity of the receiving portion, the mounting portion having the first side metal fixture attached thereon. The resin float comprising a back wall and a front wall, the mounting portion includes a first recess portion including a peripheral wall portion, the first recess portion formed by recessing the back wall of the resin float toward a side of the front wall of the resin float, and a nut accommodating portion configured to accommodate and fix a nut, the nut accommodating portion formed by recessing the back wall toward the side of the front wall, a bottom portion of the nut accommodating portion is integrated with a bottom portion of the first recess portion.

Preferably, a sloping portion provided in a first side of the resin float, the sloping portion being configured so that a distance between the front wall and the back wall gradually decreases in a direction from a second side of the sloping portion to a first side of the sloping portion, wherein the receiving portion is a rising wall portion rising from a first side of the sloping portion toward a direction in which the front wall is away from the back wall, the peripheral wall portion of the first recess portion is partly integrated with the rising wall portion.

Preferably, the mounting portion includes a pair of the nut accommodating portions which are spaced apart in a direction along the receiving portion, a second recess portion provided in the first side of the resin float than a line connecting one nut accommodating portion and the other nut accommodating portion, the second recess portion provided at a position between one nut accommodating portion and the other nut accommodating portion in the direction along the receiving portion, the second recess portion recessed from a bottom surface of the first recess portion toward the side of the front wall, a bottom portion of the second recess portion is integrated with the front wall.

Preferably, a plurality of the mounting portions are provided in a direction along the receiving portion.

Preferably, the mounting portion includes a rasp-cut nut fixed to the nut accommodating portion, a screw configured to be screwed to the rasp-cut nut and fix the first side metal fixture, and the first side metal fixture configured to fix the solar panel and having the screw screwed thereon, the first side metal fixture includes a lower metal fixture having the second side arranged under the solar panel, and an upper metal fixture having the second side arranged on the upper side of the solar panel, the first side of the lower metal fixture and the first side of the upper metal fixture are fixed together to the rasp-cut nut with the screw so that a lower side and an upper side of the solar panel are fixed to the resin float.

Preferably, the second side of the upper metal fixture is configured to clamp the solar panel between the second side of the upper metal fixture and the lower metal fixture so that the second side of the upper metal fixture presses the solar panel toward the lower metal fixture, the lower metal fixture has the second side provided with a U-shaped hook portion, the lower metal fixture is fixed to the solar panel by engaging the hook portion with an engaging portion, the engaging portion provided in the solar panel, the engaging portion configured to engage with the hook portion.

Preferably, the resin float comprises a support portion configured to support a second side of the solar panel, and a second side metal fixture configured to fix the second side of the solar panel, the second side metal fixture provided in the supporting portion. The supporting portion formed by combining a back wall of the resin float and a front wall of the resin float, the supporting portion is configured to be raised toward a side of the front wall with a second side of the supporting portion as a hinge so as to form an opening, the other sides of the supporting portion being cut off, the second side metal fixture includes a fixing portion fixed to a surface of the supporting portion in a state in which the supporting portion is raised toward the side of the front wall, the surface facing a side opposite to the hinge and the second side of the resin float, and a clamping portion formed so as to extend from the fixing portion in a direction substantially orthogonal to the fixing portion, the clamping portion configured to clamp the solar panel between the clamping portion and the supporting portion, and the second side metal fixture is configured to slide with respect to the supporting portion, when the second side metal fixture is temporarily fixed to the supporting portion, so as to change a distance between the clamping portion and the supporting portion.

Preferably, a method of manufacturing a resin float for a solar panel, the resin float comprising a front wall and a back wall, a receiving portion configured to receive a first side of the solar panel, the receiving portion provided in a first side of the resin float, and a mounting portion provided in the first side of the resin float and having a first side metal fixture attached thereto, the mounting portion provided in a vicinity of the receiving portion, the mounting portion including a nut accommodating portion configured to accommodate and fix a nut, the nut accommodating portion formed by recessing the back wall toward a side of the front wall, and a first recess portion including a peripheral wall portion, the first recess portion formed by recessing the back wall of the resin float toward the side of the front wall of the resin float. The method comprising: integrating a bottom portion of the nut accommodating portion with a bottom portion of the first recess portion, the bottom portion of the nut accommodating portion provided in a side of the back wall, the bottom portion of the first recess portion provided in the side of the front wall.

The third aspect of the present invention provides a resin float for a solar panel, comprising: a front wall and a back wall, an annular float portion including an opening, and a mooring portion provided in a vicinity of the opening, the mooring portion configured to moor a mooring component formed by combining the front wall and the back wall.

The third aspect of the present invention provides a resin float for a solar panel that an assembly float portion can have a lot of mooring places where a mooring component such as the anchor rope can be connected and to provide a resin float for a solar panel that can constitute the assembly float portion that can be moored steadily.

Various embodiments of the present invention are described below. The embodiments below can be combined with each other.

Preferably, the resin float comprises a supporting portion configured to support a second side of the solar panel, the supporting portion formed by combining the back wall and the front wall, the supporting portion configured to be raised the front wall side with a side of the supporting portion as a hinge so as to form the opening of the annular float portion, the side of the supporting portion connected to an inner wall of the opening of the annular float portion, wherein the mooring portion is provided in a vicinity of a first side of the opening of the annular float portion.

Preferably, the resin float comprises a second side metal fixture attached to a side of the supporting portion facing the hinge, the second side metal fixture clamping the solar panel between the second side metal fixture and the supporting portion, and a stopper portion provided in a vicinity of both ends which are provided at an edge portion of the first side of the opening, the stopper configured to receive a part of the second side metal fixture when the supporting portion is reclined on the opening so as to close the opening in a state in which the second side metal fixture is attached to the supporting portion.

Preferably, the second side metal fixture includes a fixing portion fixed to a surface of the supporting portion in a state in which the supporting portion is raised a side of the front wall, the surface facing a side opposite to the hinge and a second side of the resin float, and a clamping portion formed so as to extend from the fixing portion in a direction substantially orthogonal to the fixing portion, the clamping portion configured to clamp the solar panel between the clamping portion and the supporting portion, and the surface of the supporting portion is provided with a finger insertion recess configured to be inserted a finger between the fixing portion and the supporting portion.

Preferably, the mooring portion is provided substantially in the middle of the resin float.

Preferably, the resin float comprises an eyebolt configured to fix a mooring component, and a nut having the eyebolt screwed thereto, wherein the mooring portion includes a first through hole in which the eyebolt is inserted.

Preferably, the resin float comprises a first fixing plate disposed on the side of the front wall or a side of the back wall of the mooring portion, a pair of first bolts configured to fix the first fixing plate, and a pair of first nuts having the first bolt screwed thereto. The mooring portion includes a pair of a second through holes having the first bolt inserted therein, the first bolt provided between one of the second through holes and the other of the second through holes, the first fixing plate includes a plurality of through holes in which the eyebolt and the first bolt are inserted, the plurality of through holes facing the first through hole and the second through hole, the first and second through holes are provided side by side in a direction along an edge portion of the first side of the opening.

Preferably, the resin float comprises a second fixing plate provided on the front wall of the mooring portion. The first through hole includes a taper portion formed by recessing the front wall toward the side of the back wall, the taper portion tapered in a direction from the front wall to the side of the back wall, the second fixing plate is configured to cover the taper portion when the first fixing plate is disposed on the side of the back wall, the second fixing plate includes a through hole in which the eyebolt is inserted, the through hole facing the first through hole.

The fourth aspect of the present invention provides a float assembly including a plurality of resin floats for the solar panel, comprising: a pier including a linear float portion formed by connecting the plurality of floats arranged in a line, and an assembly float portion formed by connecting the plurality of the floats and having the solar panel provided thereon. The pier includes a base end, and the float provided at the base end is directly connected to the float of the assembly float portion.

The fourth aspect of the present invention provides a float assembly capable of reducing the length of the cable and reducing the maintenance burden of the cable.

Various embodiments of the present invention are described below. The embodiments below can be combined with each other.

Preferably, a float assembly including a plurality of resin floats for the solar panel, comprising: a float assembly comprises a pier including a linear float portion formed by connecting the plurality of the floats arranged in a line, an assembly float portion formed by connecting the plurality of the floats and having the solar panel provided thereon, and a connected float portion configured to connect the assembly float portion and the pier, the connected float portion formed by connecting the plurality of the floats. A float number in a width direction of the connected float portion is greater than a float number in the width direction of the pier and less than a float number of a side floats of the assembly float portion having the connected float portion connected thereto.

Preferably, the float number in the width direction of the connected float portion increases from a side of the pier to a side of the assembly float portion.

Preferably, the pier includes a plurality of the linear float portions which are arranged side by side, adjacent linear float portions are connected via a passage joint.

Preferably, the pier includes three or more the linear float portions.

Preferably, a method for installing float assembly, comprising: an assembly float portion formed by connecting the plurality of floats for a solar panel and having the solar panel provided thereon, a pier including a linear float portion formed by connecting the plurality of the floats arranged in a line, wherein, installing the float assembly to connect the pier to the assembly float portion so that the pier is located on the north side or the south side.

BRIEF DESCRIPTION OF THE DRAWINGS

FIG. 3A is a perspective view. FIG. 3B is a plan view.

FIG. 4A is a perspective view. FIG. 4B is a plan view.

FIG. 8A is an enlarged perspective view of the front wall side, and FIG. 8B is an enlarged plan view of the rear wall side.

FIG. 9A is a cross-sectional view showing a part of a cross section taken along line Y-Y of FIG. 8B. FIG. 9B is a cross-sectional view showing a part of the cross section taken along the line X-X of FIG. 8B.

FIG. 12A is a view showing a state in which no component for fixing the mooring component such as the eyebolt is attached.

DESCRIPTION OF EMBODIMENTS

Figure 1:
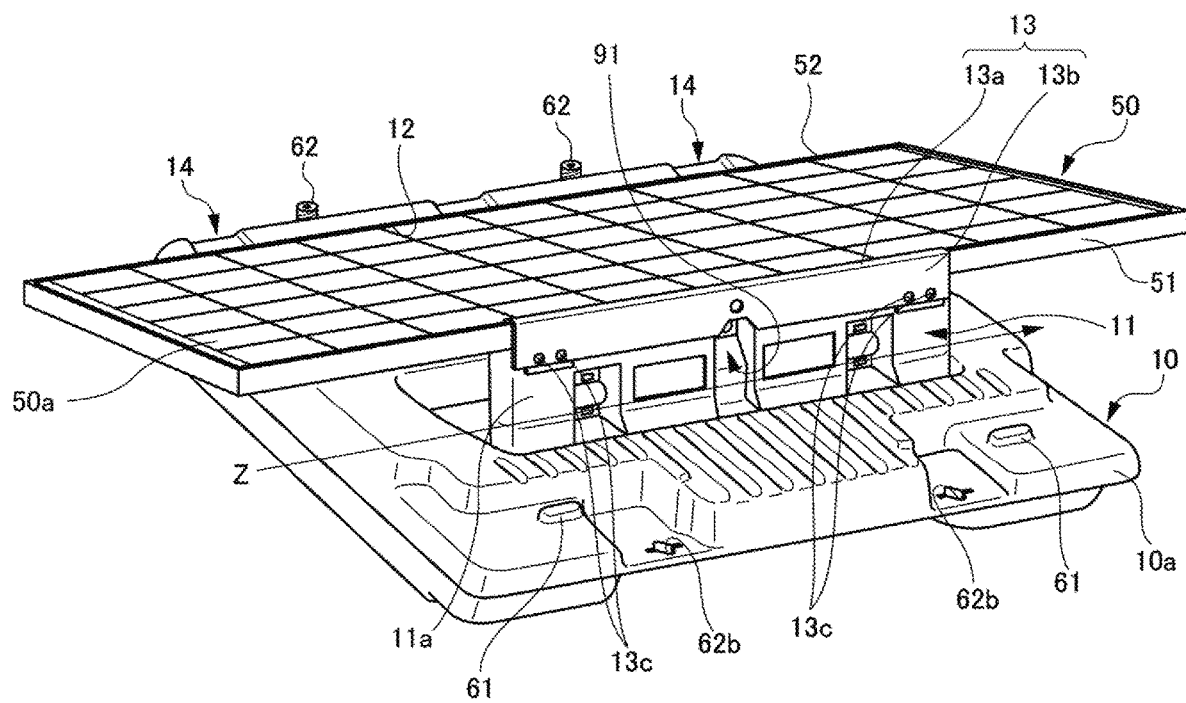
FIG. 1 is a perspective view showing a state in which the solar panel is installed on the float according to an embodiment of the present invention.

Hereinafter, embodiments for carrying out the present invention (hereinafter referred to as "embodiments") will be described in detail with reference to the accompanying drawings.

Note that the same reference numerals are attached to the same elements throughout the description of the embodiments.

Figure 2:
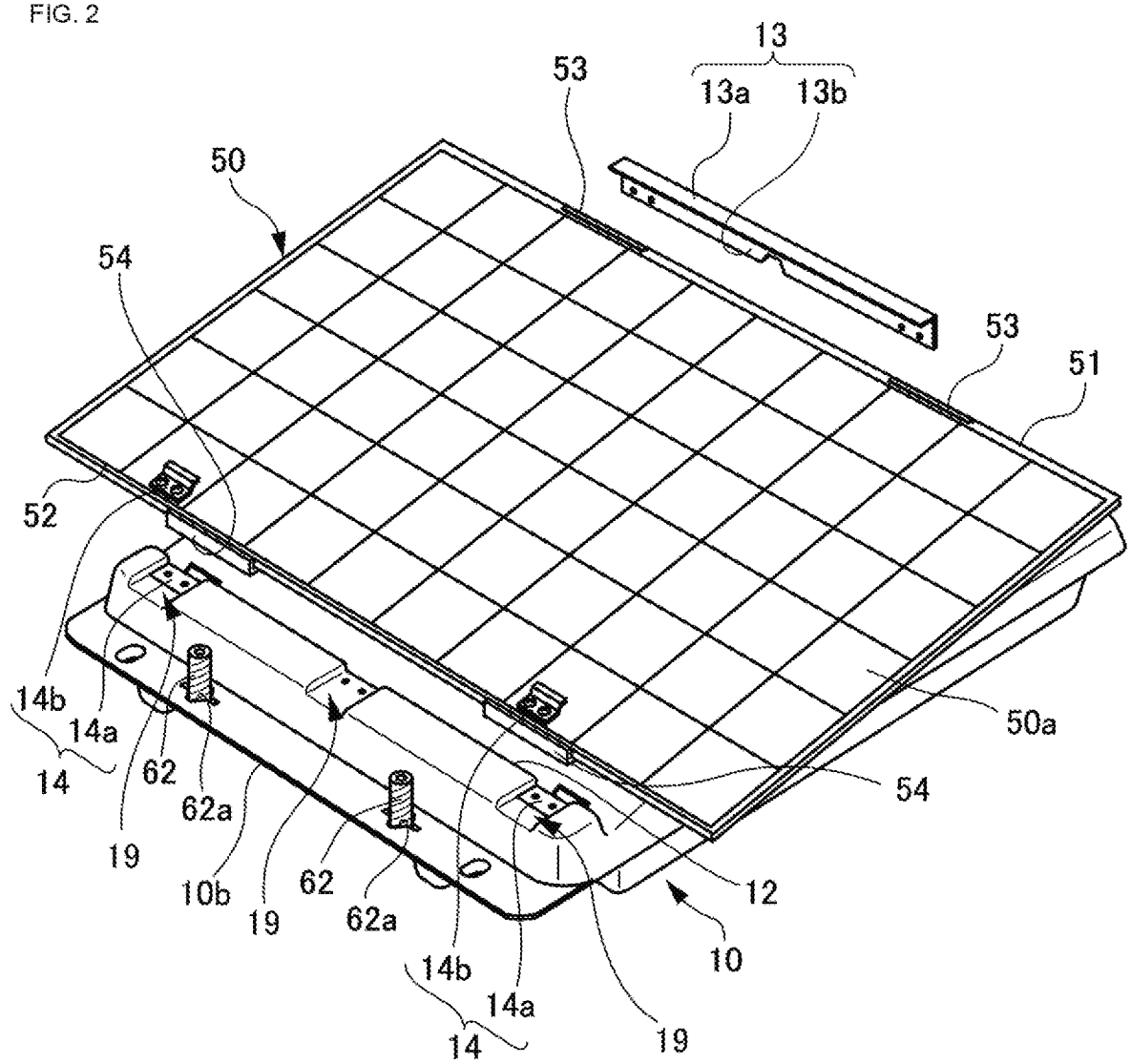
FIG. 2 is a perspective view showing a state in which the solar panel is removed from the float according to the embodiment of the present invention.

FIG. 1 is a perspective view showing a state in which the solar panel 50 is installed in the float 10. FIG. 2 is a perspective view showing a state in which the solar panel 50 is removed from the float 10.

In the following description, a side in which the solar panel 50 of the float 10 is installed may be referred to as an upper side, and a side in which the float 10 is installed on the water surface may be referred to as a lower side. And in the solar panel 50 and the like, a side of the water surface side is may be referred to as the lower side, and a side opposite to the water surface side may be referred to as the upper side.

Figure 10:
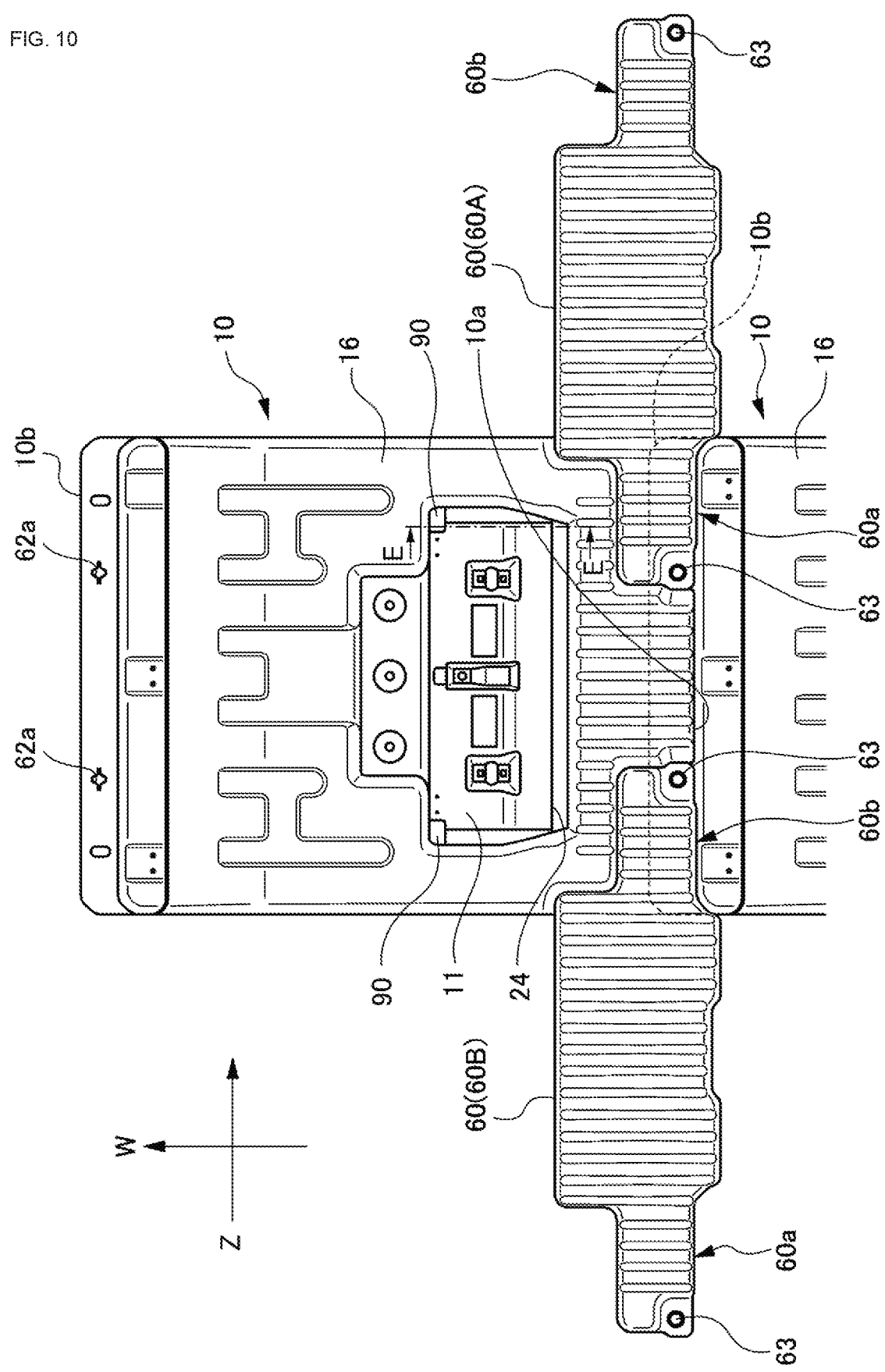
FIG. 10 is a view showing a connection of the floats according to the embodiment of the present invention by the passage joint.

The assembly float portion 120 (see FIG. 14) where the solar panel 50 is installed is constituted by connecting the float 10 of the present embodiment shown in FIGS. 1 and 2 with the passage joint 60 (see FIG. 10).

It is noted that the assembly float portion 120 (see FIG. 14) is a portion where the float 10 gathers thousands (for example, ten thousands). The solar panel 50 are not installed in the floats 10 of a part of the assembly float portion 120. Another part of the floats 10 are used as passage for maintenance and inspection of the solar panel 50. Another part of the floats 10 are also used to lay the cable connected to the solar panel 50.

Meanwhile, the assembly float portion 120 (see FIG. 14) needs to be installed at a position where power generation efficiency of the solar panel 50 is high. Thus, it is also important to avoid moving due to wind.

Thus, the float 10 also has a configuration that can moor the mooring component such as the anchor rope in order to moor the mooring component of the anchor rope provided with the float 10 which is used as the passage as described above.

The float assembly 100 (see FIG. 14) of the present embodiment can lay the cable from the assembly float portion 120 to facilities on land by utilizing not only the assembly float portion 120 (see FIG. 14) above, but also the float 10.

As described above, the float 10 of the present embodiment can be used as the float for installing the solar panel 50 and as a float constituting a passage.

Below, a configuration to install the solar panel 50 will be described. Next, a configuration used as a passage and used as the mooring component moored float will be described.

Further, after describing the float 10, a configuration of the float assembly 100 (see FIG. 14) will be described in detail.

As shown in FIG. 1, the float 10 of the present embodiment supports a short side of, the substantially rectangular shape of, the solar panel 50 so as to be inclined. The float 10 is a float for the solar panel where the solar panel 50 can be installed, for example, in the pond or the lake.

Outline of Installation of the Solar Panel

As shown in FIG. 1, the float 10 comprises a supporting portion 11 and a receiving portion 12. The supporting portion 11 is configured to support second side 51 of a pair of longitudinal sides of the solar panel 50. The receiving portion 12 is configured to receive the first side 52 of a pair of longitudinal sides of the solar panel 50. The Second side 51 is also referred to as one side (second side). The first side 52 is also referred to as the other side (first side).

The height of the supporting portion 11 is determined so that an inclined state of the solar panel 50 becomes appropriate in consideration of the power generation efficiency of the solar panel 50.

As shown in FIG. 2, second side 51 of the solar panel 50 is provided with the base 53 made of aluminum. The base 53 is supported by the supporting portion 11. This the base 53 is supported on the supporting portion 11.

On the other hand, the float 10 has the second side metal fixture 13 provided in one side of the float 10. The second side metal fixture 13 fixes the second side 51 (one side) of the solar panel 50 to the supporting portion 11.

Then, the solar panel 50 is clamped between the second side metal fixture 13 and the supporting portion 11.

For example, in Patent Literature 1, the elastomer fixing portion is used in order to fix the solar panel to the float. The elastomer fixing portion has a groove for clamping the frame of the solar panel and the frame is elastically clamped by inserting the edge of the frame into the groove.

However, in Patent Literature 1, even when the force is applied in the direction in which the solar panel floats due to strong wind, the stress may be applied in the direction such that the clamping of the solar panel is released, and the solar panel may come off the float. The direction corresponds to the direction in which the groove extends.

On the other hand, the second side metal fixture 13 of the present embodiment can clamp the solar panel 50 more firmly than the configuration of Patent Document 1.

Further, as shown in FIG. 2, a base 54 is provided at the first side 52 of the solar panel 50. The base 54 is made of aluminum, similarly to the base made of aluminum provided at second side 51.

And the float 10 has two first side metal fixtures 14 provided in the other side of the float 10. The first side metal fixture 14 fixes the first side 52 (the other side) of the solar panel 50 received by the receiving portion 12 to the float 10. The other side of the solar panel 50 is fixed to the float 10 with these first side metal fixtures 14.

Since the first side metal fixtures 14 are provided in this way, the solar panel 50 can be more firmly held, in the first side 52 (the other side) of the solar panel 50, than the configuration of the patent document 1.

In this embodiment, the first side metal fixture 14 can also be provided in the center. If necessary, the base may be provided at a position between the two bases 54, and three positions may be fixed with the three first side metal fixtures 14. Thus, the first side 52 (the other side) of the solar panel 50 is fixed more firmly and more stably.

However, in attaching the first side metal fixture 14 to the float 10, the bases 53, 54 may not need to be provided in the solar panel 50.

Overall Structure of Float

Figure 3A:
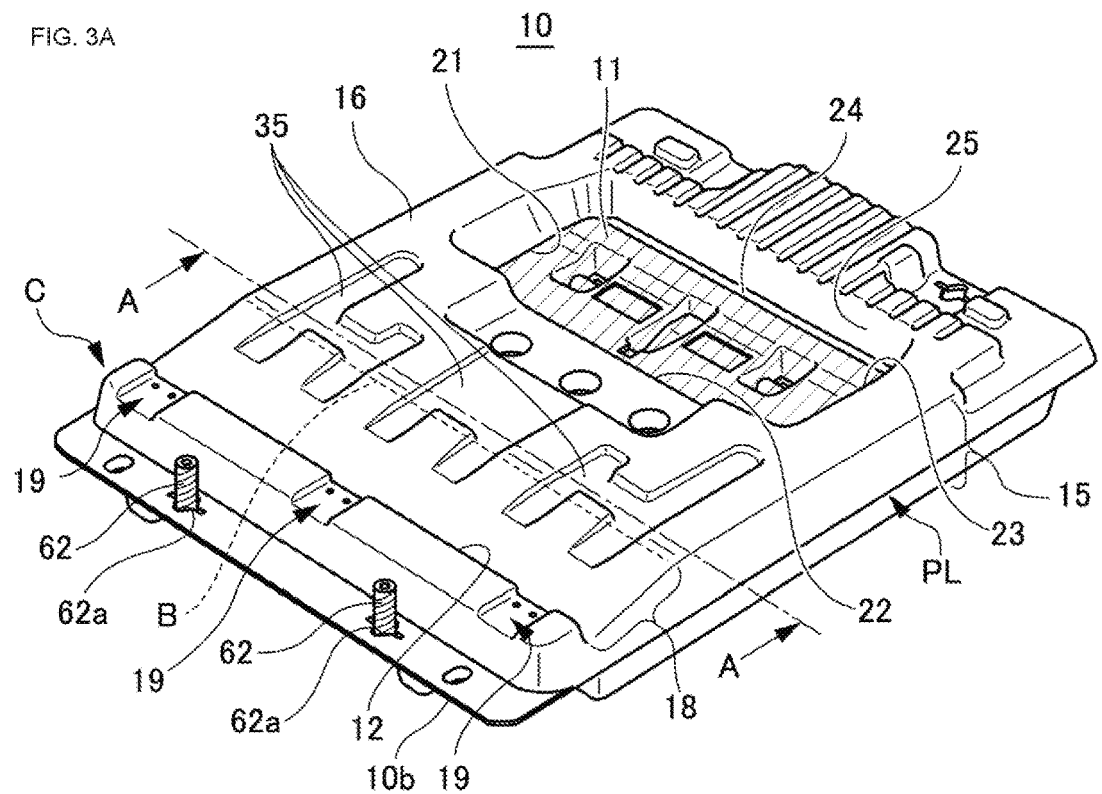
FIGS. 3A and 3B are a view of the float of the embodiment according to the present invention as seen from above.
Figure 3B:
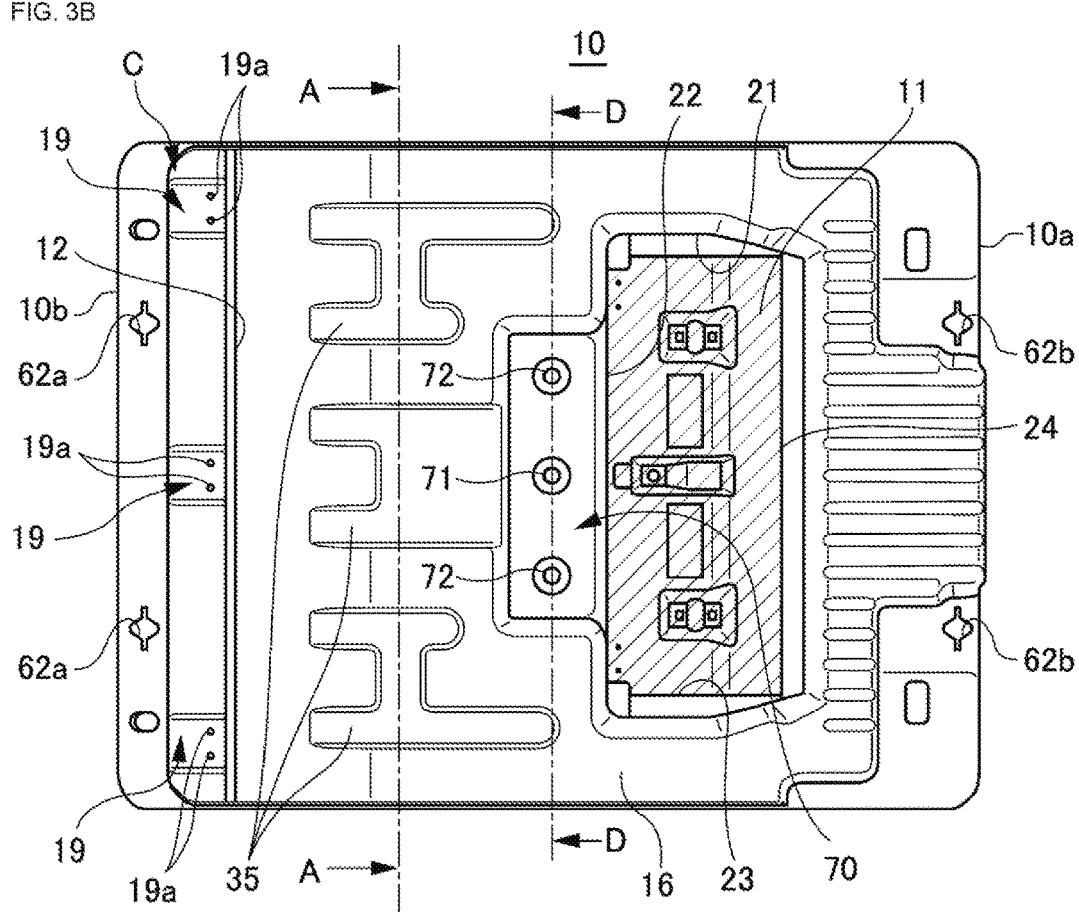
Figure 4A:
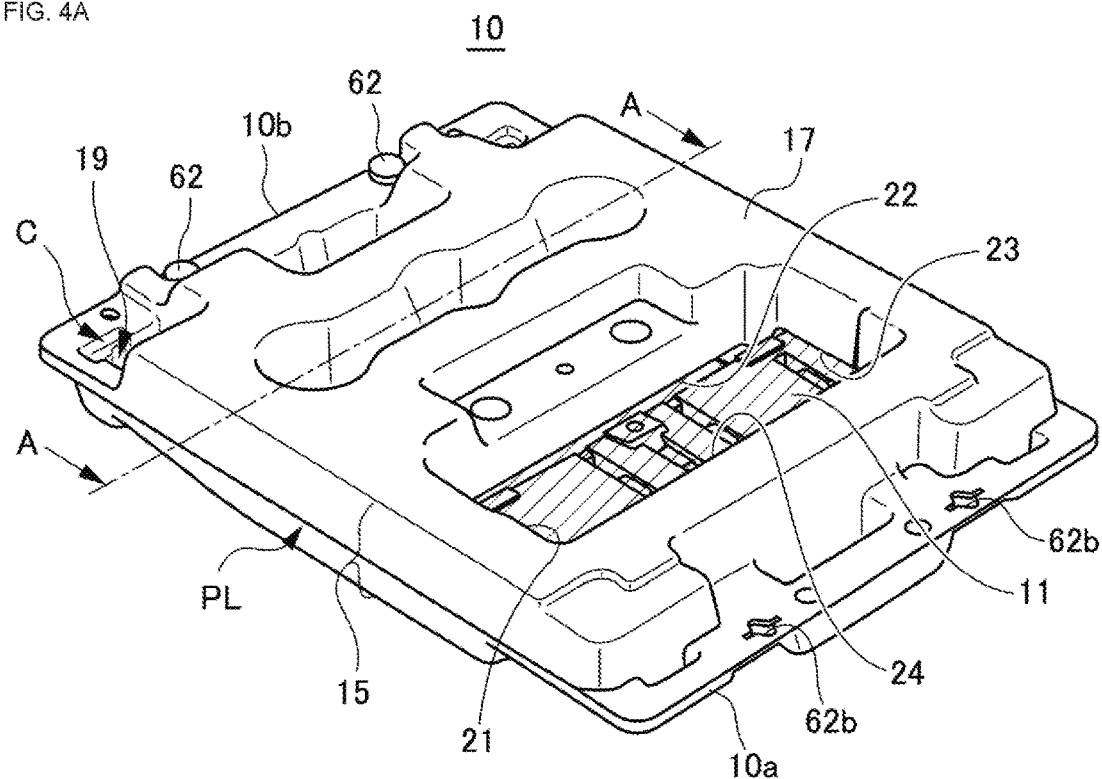
FIGS. 4A and 4B are a view of the lower side of the float according to the embodiment of the present invention.
Figure 4B:
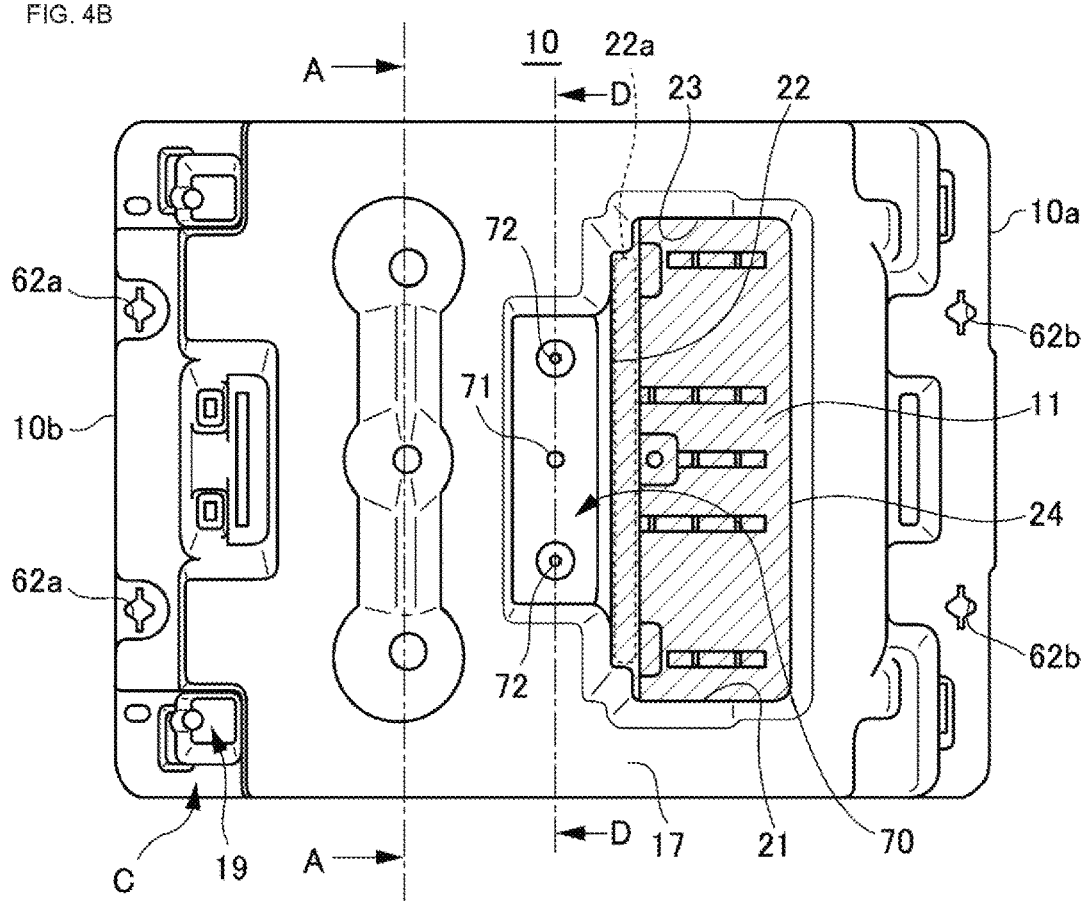

Hereinafter, the float 10 will be described in detail with reference to the drawings. FIG. 3 is a view of the float 10 seen from above. FIG. 3A is a perspective view. FIG. 3B is a plan view. FIG. 4 is a view of the float 10 under the floor. FIG. 4A is a perspective view. FIG. 4B is a plan view.

Figure 5:
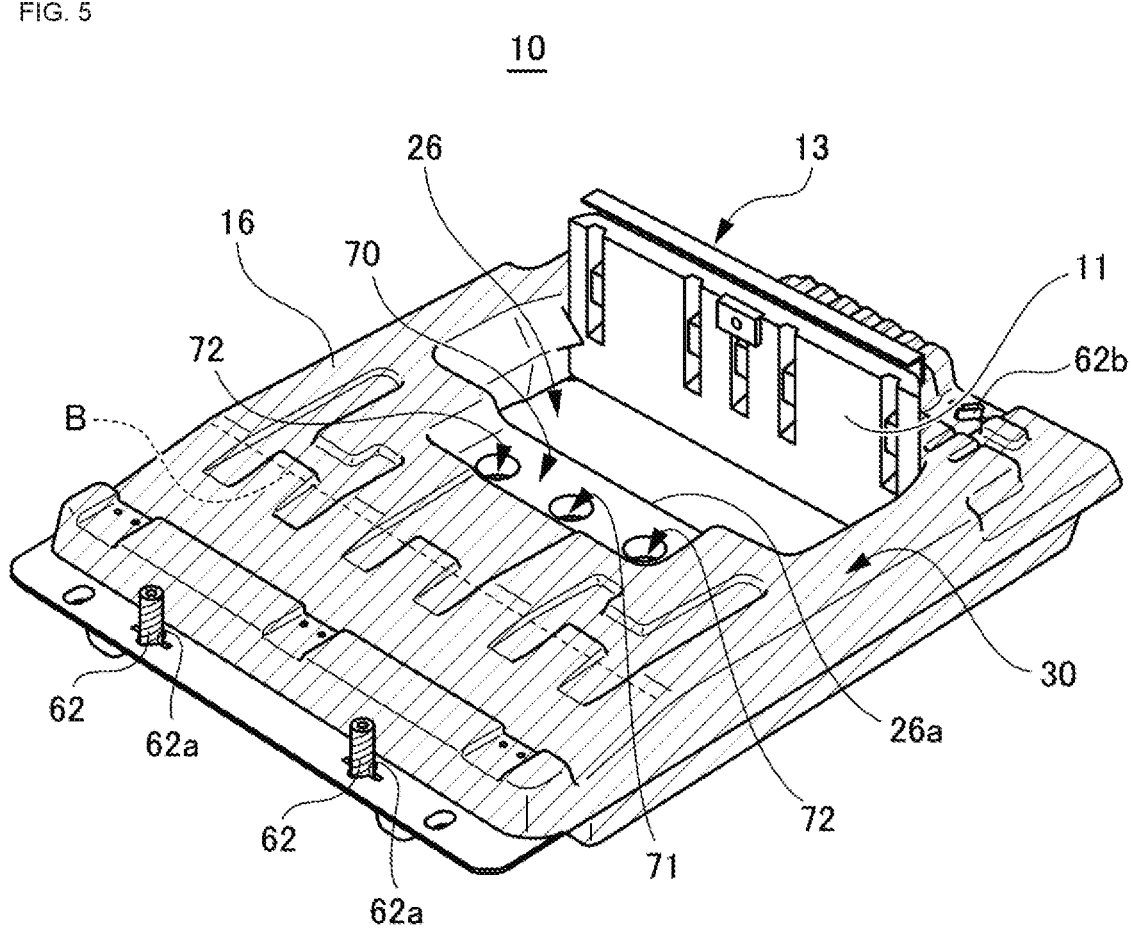
FIG. 5 is a perspective view of the float of the embodiment according to the present invention as seen from above, showing a state in which the supporting portion is raised.
Figure 6:
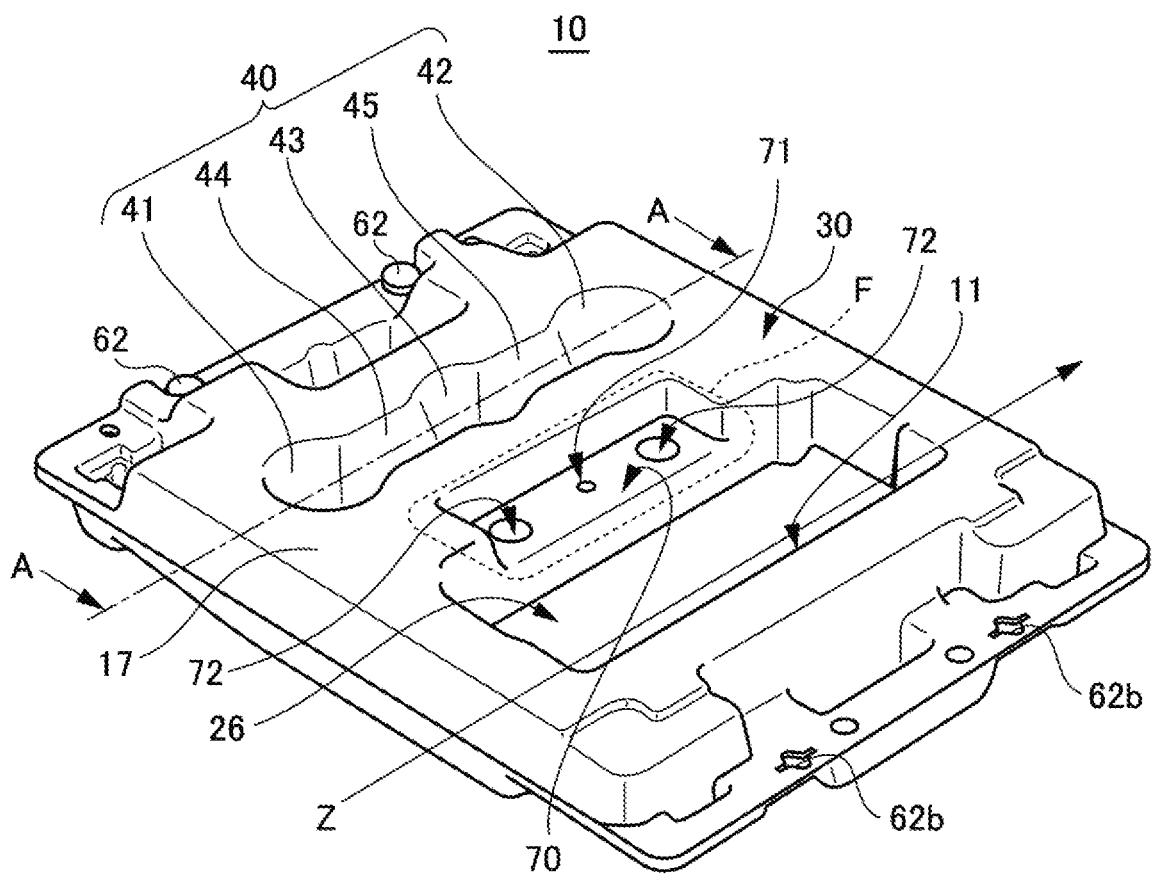
FIG. 6 is a perspective view of the bottom side of the float showing the state in which the supporting portion is raised according to the embodiment of the present invention.

FIG. 5 is a view corresponding to FIG. 3A. That is, FIG. 5 is a perspective view as seen from the upper side of the float 10, and FIG. 5 is a perspective view showing a state where the supporting portion 11 is raised. FIG. 6 is a view corresponding to FIG. 4A. That is, FIG. 6 is a perspective view as seen from the lower side of the float 10. FIG. 6 is a perspective view showing a state where the supporting portion 11 is raised.

In FIG. 5, the state, in which the second side metal fixture 13 is temporarily fixed to the supporting portion 11, is also shown.

The float 10 is manufactured, for example, by blow molding. In blow molding, a tubular parison in a molten state is sandwiched between a plurality of split molds and inflated. As the molding material, various thermoplastic resins can be used. For the molding material, for example, a polyolefin resin such as polyethylene or polypropylene can be suitably used.

As shown in FIGS. 3 and 4, the float 10 has a rectangular overall shape (rectangular shape) as a whole. As shown in FIGS. 3A and 4A, the float 10 includes the side wall 15 including the parting line PL, the front wall 16 located on the upper side (see FIG. 3A) and the back wall 17 located on the lower side (see FIG. 4A). The float 10 has a hollow portion for accommodating gas (air, and so on) therein.

The Supporting Portion and the Opening

As shown in FIGS. 3A and 4A, the supporting portion 11 (see hatching portion) is formed in the float 10. The supporting portion 11 is formed by combining the back wall 17 and the front wall 16. The supporting portion 11 is configured to support the solar panel 50.

FIGS. 3 and 4 show a state before raising the supporting portion 11 as shown in FIG. 1. Three sides 21, 22, and 23 other than the side 24 are cut. The side 24 is provided at one side of a periphery of the supporting portion 11. The side 24 at the one side functions as a hinge. The supporting portion 11 can be raised to a side of the front wall 16, on which the solar panel 50 is disposed, so as to form the opening 26 (see FIGS. 5 and 6).

As shown in FIG. 5, the float 10 of the present embodiment includes an annular float portion 30 (see hatching portion) formed so as to surround the opening 26. This annular float portion 30 has a hollow structure, and the annular float portion 30 has gas (air, and so on) to obtain buoyancy for floating.

As shown in FIG. 1, when installing the solar panel 50, the supporting portion 11 is raised to the side of the front wall 16. At this time, it is raised so as to abut against an inner wall 25 (see FIG. 3A), of the opening 26, provided on the side 24 as a hinge. The solar panel 50 is installed so that a lower side of one side of the solar panel 50 is supported on the side 22. The side 22 is provided on a side opposed to the one side 24 as the hinge.

As shown in FIG. 4B, a receiving rib 22a (see a dotted line) is provided near the side 22. The receiving rib 22a is configured to receive the second side 51 of the solar panel 50. In particular, the receiving rib 22a includes a step structure. The step structure is formed by approaching the back wall 17 to the side of the front wall 16. Upon installation of the solar panel 50 in the float 10, the second side 51 of the solar panel 50 is received in the step structure. Therefore, the second side 51 of the solar panel 50 does not deviate toward one side beyond the supporting portion 11.

Thus, configuring the supporting portion 11, the opening 26 is located in a vicinity of the supporting portion 11. Since the inner wall 25 of the opening 26 functions as a wall surface for suppressing structural deflection, and the float 10 is unlikely to be deflected.

Also, the supporting portion 11 has a structure connected to the body of the float 10 with a hinge structure. Therefore, even if deflection occurs in the float 10, the supporting portion 11 is hardly affected. Further, the supporting portion 11 is constructed such that the back wall 17 and the front wall 16 are formed with combining. That is, the back wall 17 and the front wall 16 are not too far apart. Thus, the rigidity of the supporting portion 11 is further enhanced, and the float 10 is not easily deformed under the influence of deflection.

Therefore, even in a situation where the float 10 is subjected to stress due to the influence of the weight of the worker, the supporting portion 11 is less susceptible to the influence of the deflection of the float 10. This situation is a situation where the worker is in the passage joint 60 (see FIG. 10) near the float 10 for performing the fixing work of the assembly float portion 120 (see FIG. 14). Also, this situation is a situation where worker are putting their feet on the float 10 performing the fixing work.

Thus, the worker can perform the fixing work of fixing the second side 51 (one side) of the float 10 with the second side metal fixture 13 without influence of the deflection. And it is avoided that an attachment of the second side metal fixture 13 becomes loose due to the deflection of the float 10.

On the other hand, in the present embodiment, the first side metal fixture 14 is fixed to the mounting portion 19 (see FIG. 2). When the mounting portion 19 deflects, the worker becomes hard to work to fix the first side metal fixture 14. As a result, the fixing of the first side metal fixture 14 becomes insufficient. Also, even if the first side metal fixture 14 is properly fixed, if the mounting portion 19 repeatedly deflects due to various factors, the fixation of the first side metal fixture 14 may loosen. Various factors refer to factors such as the worker passing over the float during the fixing work.

Thus, the mounting portion 19 itself is configured to be less susceptible to deflecting. Furthermore, the float 10 is also configured to increase the rigidity of itself. As a result, the deflection of the float 10 itself is reduced, and the stress which deflects the mounting portion 19 is less likely to occur. This point will be explained below.

Float Bending Prevention Structure

Although the supporting portion 11 is not visible in FIG. 6, it shows the sign of the supporting portion 11 with the arrow where the supporting portion 11 is located. The Z axis shown in FIG. 6 is in the same direction as the direction along the supporting portion 11 (see Z axis in FIG. 1) shown in FIG. 1.

In the float 10, as shown in FIG. 6, the annular float portion 30 (see also the hatched part in FIG. 5) is provided. The annular float portion 30 is provided so as to surround the opening 26 and has a gas (air, and so on) for generating buoyancy therein. As shown in FIG. 6, the recess 40 having a peripheral wall is provided in the annular float portion 30. The recess 40 is provided at the opposite side of the opening 26 with respect to the supporting portion 11. More specifically, the recess 40 is formed by recessing the back wall 17 toward the side of the front wall 16.

Figure 7:
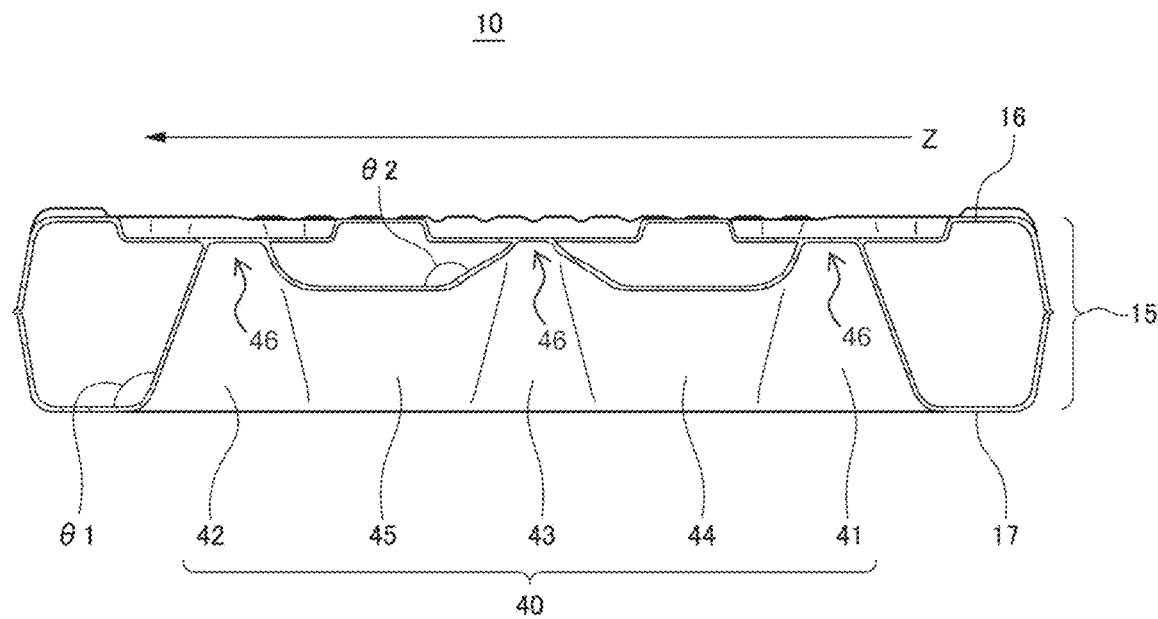
FIG. 7 is a cross-sectional view taken along a line A-A shown in FIGS. 3B, 4B, and 6.

FIG. 7 is a cross-sectional view taken along line A-A shown in FIGS. 3, 4, and 6. In FIG. 7, the upper side is the side of the front wall 16 of the float 10. The lower side is the side of the back wall 17 of the float 10. The Z axis shown in FIG. 7 is in the same direction as the direction along the supporting portion 11 (see Z axis in FIG. 1) shown in FIG. 1.

As shown in FIGS. 6 and 7, the recess 40 includes a truncated conical recess portion 41, a truncated conical recess portion 42, and a truncated conical recess portion 43.

The truncated conical recess portion 41 is provided at one end of the direction along the supporting portion 11 (see Z axis). The truncated conical recess portion 41 is tapered in a direction toward the front wall 16.

The truncated conical recess portion 42 is provided at the other end. The truncated conical recess portion 42 is tapered in the direction toward the front wall 16.

The truncated conical recess portion 43 is provided at the center between the truncated conical recess portion 41 and the truncated conical recess portion 42. The truncated conical recess portion 43 is tapered in the direction toward the front wall 16.

That is, the recess 40 has truncated conical recess portions 41, 42, 43 tapering toward the front wall 16 at both ends and the center of the direction along the supporting portion 11 (see the Z axis).

Also, the recess 40 has groove-shaped recesses 44, 45. The groove-shaped recess 44, 45 connects the truncated conical recess portions 41, 42, 43 in the direction along the supporting portion 11 (see Z axis). The groove-shaped recesses 44, 45 is formed so that its width becomes narrower in the direction toward the front wall 16.

As shown in FIG. 7, in tip portions 46 of the truncated conical recess portion 41, 42, 43, the back wall 17 and the front wall 16 are integrated. On the other hand, in the groove-shaped recesses 44, 45, the back wall 17 and the front wall 16 are not integrated. By providing such a recess 40, the peripheral wall of the recess 40 functions as a rib to strengthen the rigidity, so that the float 10 is less likely to be deflected.

The bottom portion of the groove-shaped recesses 44, 45 on the side of the front wall 16 may not be integrated with the front wall 16, and the bottom portion may be used as a flow path through which gas (air, and so on) flows. This configuration improves the formability when performing blow molding.

On the other hand, as this recess 40 is formed, the volume for containing the gas (air, and so on) in the annular float portion 30 decreases. Then, in the recess 40, the back wall 17 is recessed towards the side of the front wall 16 and the recess 40 has a peripheral wall opening to the side of the back wall 17. Thus, the recess 40 functions as an air pool generating buoyancy. Therefore, the recess 40 has a function of suppressing a decrease in buoyancy accompanying a decrease in the capacity of the gas (air, and so on) in the float 10.

By the way, the float 10 is installed in a sunny place so that the solar panel 50 has better power generation efficiency. Therefore, when the air temperature (for example, daytime) is high, the gas (air, and so on) in the float 10 expands. When the temperature (for example, at night) decreases, the gas (air, and so on) in the float 10 which has expanded contracts. The float 10 itself also causes expansion and contraction.

This expansion and contraction differ from the deflection (deformation) caused by the worker riding on the float 10, but this expansion and contraction also cause deflection (deformation). However, in the present embodiment includes, as described above, the recess 40. Thus, the total amount of gas (air, and so on) in the annular float portion 30 decreases. Therefore, the expansion and contraction force of gas (air, and so on) in the float 10 is suppressed. As a result, occurrence of deflection (deformation) of the float 10 due to temperature difference between day and night is also suppressed.

In particular, the back wall 17 and the front wall 16 are integrated in the tip 46 of the truncated conical recess portions 41, 42, 43 as described above. Therefore, even when the gas (air, and so on) expands, the front wall 16 and the back wall 17 do not move so as to be separated from each other. Conversely, when the gas (air, and so on) contracts, the front wall 16 and the back wall 17 do not move so as to approach each other. Therefore, deflection (deformation) of the float 10 is further suppressed.

As described above, the recess 40 has an effect as a reinforcing rib for increasing the rigidity. On the other hand, since the recess 40 is formed by recessing the back wall 17 towards the front wall 16, a thickness of the recess 40 becomes thinner. Therefore, pinholes may be generated during molding in the recess 40.

Therefore, a portion most recessed toward the side of the front wall 16 is in a form of a truncated cone in order not to locally vary a thickness of the recess 40 in molding. Also, as shown in FIG. 6, a diameter of the bottom side (opening side) of the truncated conical recess portions 41, 42, 43 is larger than a width of the groove-shaped recesses 44, 45. In the truncated conical recess portions 41, 42, 43, a gently inclined surface is formed, and the recess 40 is suppressed from becoming thin.

Further, as shown in FIG. 7, in the configuration of the embodiment, occurrence of pinholes caused by the back wall 17 adjacent to the recess 40 and near the start point of the truncated conical recess portions 41, 42 being thin is taken into consideration. In particular, the truncated conical recess portions 41, 42 are raised from the back wall 17 adjacent to the recess 40 to the side of the front wall 16 at an angle of θ1 (110°).

The tip of the truncated conical recess portion 43 is raised from the bottom surface of the groove-shaped recesses 44, 45 on the side of the front wall 16 to the side of the front wall 16 at an angle of θ2 (145°).

The angles are examples. Preferably, θ1 is set within a range of 110°±15°. Preferably, θ2 is set within the range of 145°±15°.

Further, the diameter of the first part is smaller than the diameter of the second part.

Here, as shown in FIG. 7, the first part is a part where the back wall 17 of the truncated conical recess portion 43 located at the center of the recess 40 is integrated with the front wall 16.

The second part is a part where the back wall 17 of the two truncated conical recess portions 41, 42 located at both ends of the recess 40 is integrated with the front wall 16. Thus, the formability of the float 10 can be improved.

By providing the recess 40 formed so that the back wall 17 is recessed toward the side of the front wall 16 in the annular float portion 30, it is possible to prevent the buoyancy of the float 10 from decreasing, and it is possible to suppress the expansion and contraction of the gas that causes the float 10 to deform, while suppressing the volume of the gas (air, and so on) in the float 10, and it is possible to increase the rigidity.

Therefore, the occurrence of the deflection (deformation) of the float 10 itself is suppressed, and the stress applied to the mounting portion 19 inducing the deflection is reduced, so that the occurrence of deflection of the mounting portion 19 is suppressed. As a result, it can be suppressed that the fixation of the first side metal fixture 14 (see FIG. 2) becomes loose.

By suppressing a depth of recess, it is possible to realize the wall thickness so that no pinholes are generated in the recess 40 when molding the truncated conical recess portions 41, 42, 43. The depth of recess is determined so that the back wall 17 and the front wall 16 forming the groove-shaped recesses 44, 45 are not integrated.

A degree to which the back wall 17 forming this groove-shaped recesses 44, 45 is to be separated from the front wall 16, that is, how much the depth of recess of the groove-shaped recess 44, may be determined from the viewpoint of suppressing pinholes at the time of forming the float 10.

The width of the groove-shaped recesses 44, 45 is large, the volume of the gas in the float 10 can be reduced accordingly.

Here, the recess 40 itself is open to the water surface side. Then, the water surface functions as a lid for the opening for trapping gas (air, and so on). However, at the timing when the float 10 shakes with a strong wind, a part of the gas in the recess 40 may escape.

Then, the buoyancy of the float 10 will decrease. Therefore, even if such a situation happens suddenly, it is important that the float 10 can ensure sufficient buoyancy.

And, the groove-shaped recesses 44, 45 are portions where the recess toward the side of the front wall 16 is shallowly formed. Therefore, from the viewpoint of pinholes generated during molding, even if widths of the groove-shaped recesses 44, 45 are small, pinholes are unlikely to be formed in the groove-shaped recesses 44, 45.

Also, from the viewpoint of buoyancy, each of the widths of the groove-shaped recesses 44, 45 is smaller than each of base side (opening side) diameters of the truncated conical recess portions 41, 42, 43. As a result, the volume of the gas in the float 10 does not become too small.

Furthermore, in the configuration of the present embodiment, due to the shape of the front wall 16, the deflection (deformation) of the float 10 is suppressed, the deflection of the mounting portion 19 is suppressed by the influence of the deflection of the float 10, loosening of fixation of the first side metal fixture 14 (see FIG. 2) is suppressed. This point will be described below.

Focusing the front wall 16, as shown in FIG. 7, the recess 40 is located in the line A-A in FIG. 3A. Thus, as shown in FIG. 3A, the front wall 16 includes a sloping portion 18 provided from a substantially end position (see dotted line B) on the recess 40 toward a side away from the recess 40, and the sloping portion has a distance to the back wall 17. The distance gradually decreasing in a direction from the substantially end position to the side away from the recess 40, the substantially end position is an opposite side of the opening 26 (See FIG. 5), the substantially end position sandwiching the recess 40 with the opening 26.

The sloping portion 18 is formed with a sloped surface so that the solar panel 50 is installed with an inclination of a predetermined angle. A groove 35 is provided in the sloping portion 18. The groove 35 has concave and convex structures. That is, since the groove 35 has the concave and convex structures, the groove 35 serves as a reinforcing rib for increasing the rigidity, and occurrence of deflection (deformation) is suppressed.

The groove 35 is provided from the sloping portion 18 to the opening 26 side so as to be formed also on the recess 40. By integrating the back wall 17 of the recess 40 as described above with the front wall 16 reinforced in rigidity, the overall rigidity further increases, and occurrence of deflection (deformation) is further suppressed.

Then, a tip on the sloping portion 18 side of the groove 35 is connected to the sloping portion 18 with substantially no step. Thus, the sloping portion 18 also serves to suppress accumulation of water on the float 10.

Fixation on One Side of the Solar Panel

As described with reference to FIG. 1, the solar panel 50 is fixed to the float 10 by fixing the second side 51 of the solar panel 50 to the supporting portion 11 with the second side metal 13.

As shown in FIG. 1, the second side metal fixture 13 includes a fixing portion 13b and a clamping portion 13a, and the second side metal fixture 13 is an L-shaped angle metal fixture.

The fixing portion 13b includes the other surface fixed to a surface 11a of the supporting portion 11 in a state in which the supporting portion 11 is raised. The surface 11a faces a side (Refer to the side 22 shown in FIG. 3) opposite to the hinge (Refer to the side 24 shown in FIG. 3) and one side of the float 10.

The clamping portion 13a is formed so as to extend from the fixing portion in a direction substantially orthogonal to the fixing portion 13b. The clamping portion 13a is configured to clamp the solar panel 50 between the clamping portion 13a and the supporting portion 11.

As shown in FIG. 1, the second side metal fixture 13 is screwed to the supporting portion 11 with four screws 13c. The screw holes provided in the second side metal fixture 13 are oblong holes in which the screw 13c is inserted and extend in the vertical direction. This screw hole is holes corresponding to the two screws 13c closer to the center.

Therefore, when the second side metal fixture 13 is temporarily fixed to the supporting portion 11 with the two screws 13c closer to the center, the second side metal fixture 13 is slidable with respect to the supporting portion 11 so that a distance between the clamping portion 13a and the supporting portion 11 can be changed.

Therefore, the worker temporarily fix the second side metal fixture 13 to the supporting portion 11, and the worker slide the second side metal fixture 13 so that a clearance for inserting the solar panel 50 is formed between the clamping portion 13a of the second side metal fixture 13 and the supporting portion 11. After inserting the solar panel 50 into the gap, the worker slide the second side metal fixture 13 again so that the solar panel 50 is sandwiched between the supporting portion 11 and the clamping portion 13a. Finally, the worker tighten the two screws 13c closer to the center.

Then, after the two screws 13c close to the center are fully tightened, furthermore, the second side metal fixture 13 is fixed to the supporting portion 11 with the outer two screws 13c. This completes the fixing of the solar panel 50 to the float 10 on the side of the end portion 51 (one side).

Therefore, if the second side metal fixture 13 is fixed to the supporting portion 11 so that the clamping portion 13a of the second side metal fixture 13 is firmly pressed toward the solar panel 50, the second side metal fixture 13 is unlikely to be deflected.

In addition, the worker can perform the fixing work with the second side metal fixture 13 temporarily fixed to the supporting portion 11. Therefore, workability is improved.

Fixation on the Other Side of the Solar Panel

As described above with reference to FIG. 2, the first side 52 (the other side) of the solar panel 50 is fixed to the float 10 with the first side metal fixture 14.

Figure 8A:
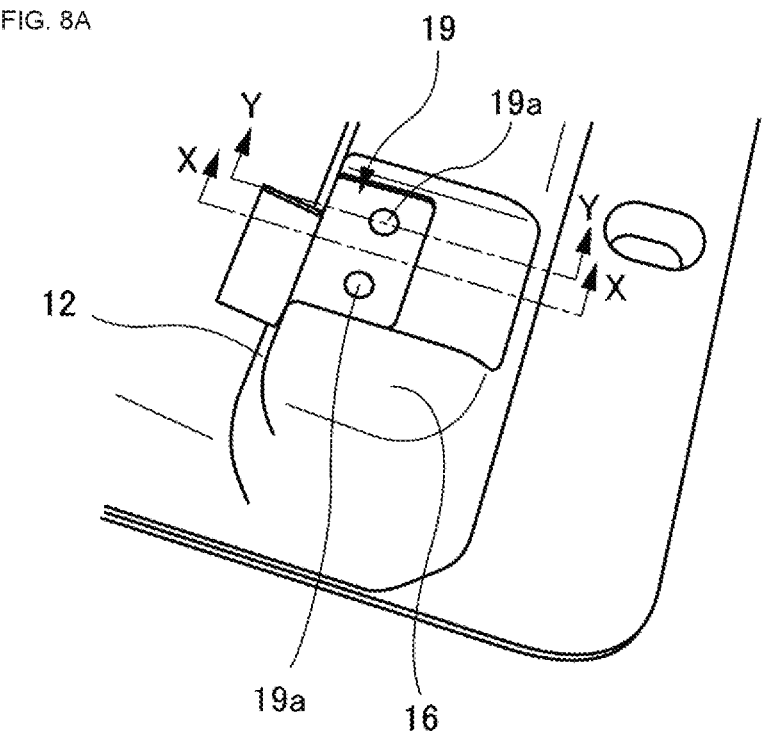
FIGS. 8A and 8B are enlarged views of the mounting portion indicated by an arrow C in FIGS. 3B and 4B.
Figure 8B:
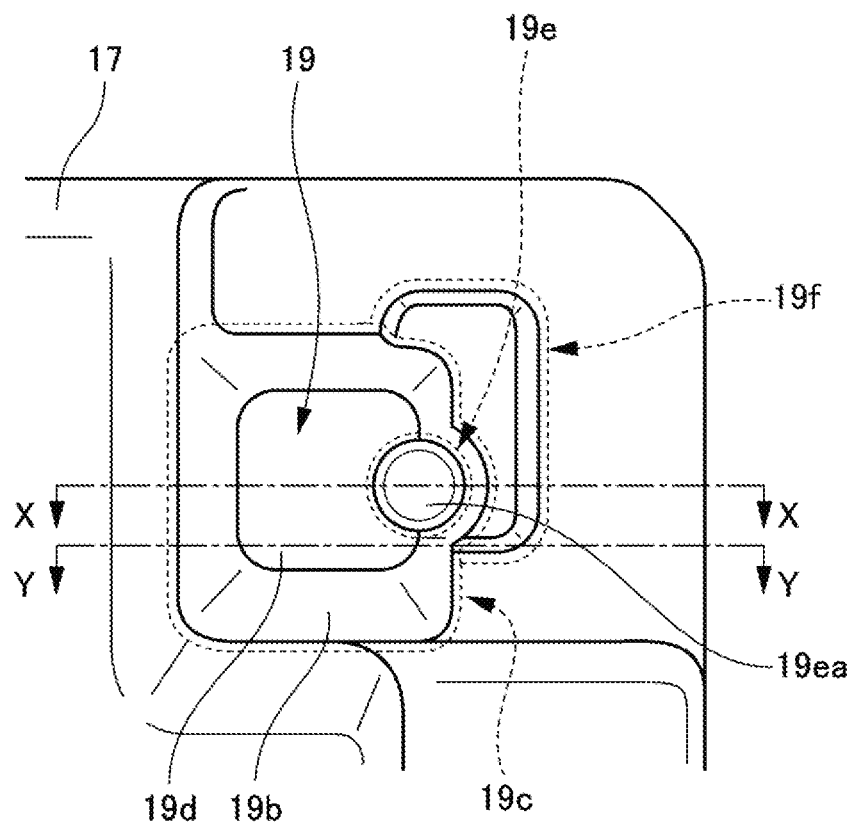

As shown in FIGS. 2 and 3, the float 10 has the mounting portion 19 for attaching the first side metal fixture 14. FIGS. 8A and 8B are enlarged views of the periphery of the mounting portion 19 indicated by an arrow C in FIGS. 3 and 4. FIG. 8A is an enlarged perspective view of the side of the front wall 16. FIG. 8B is an enlarged plan view of the side of the back wall 17.

Figure 9A:
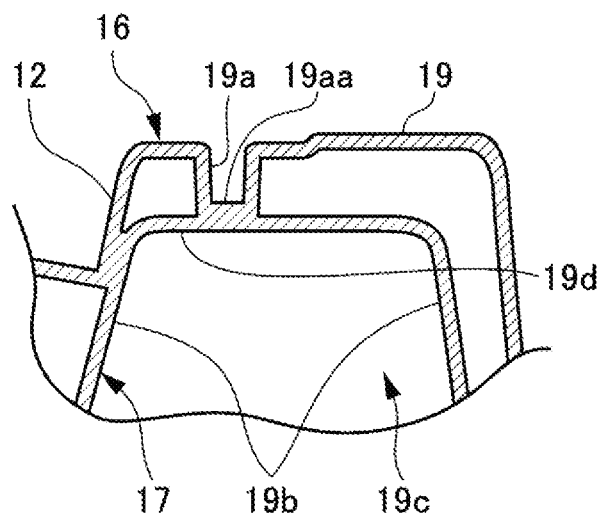
FIGS. 9A and 9B are a partial cross-sectional view of the mounting portion of the embodiment according to the present invention.
Figure 9B:
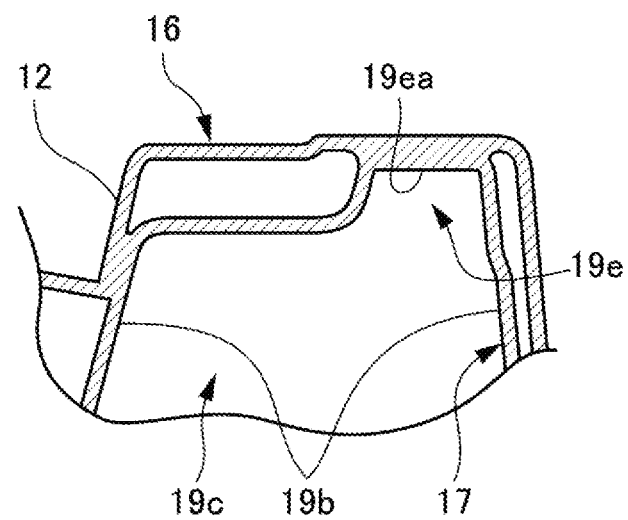

FIG. 9 are partial cross-sectional views of the mounting portion 19. FIG. 9A is a cross-sectional view showing a part of a cross section taken along line Y-Y of FIG. 8. FIG. 9B is a cross-sectional view showing a part of the cross section taken along the line X-X of FIG. 8.

In FIG. 9, the upper side is the side of the front wall 16, the lower side is the side of the back wall 17, the left side is the center side of the float 10, and the right side is the side of the float 10.

As shown in FIG. 2, the first side metal fixture 14 includes a lower metal fixture 14a and an upper metal fixture 14b. One side (a second side) of the lower metal fixture 14a is arranged on the lower side of the solar panel 50. One side (a second side) of the upper metal fixture 14b is arranged on the upper side of the solar panel 50. The other side (a first side) of the lower metal fixture 14a and the other side (a first side) of the upper metal fixture 14b are fixed together with a screw 19ac (see FIG. 11) to the mounting portion 19 to which the first side metal fixture 14 is attached.

In this way, if the lower metal fixture 14a and the upper metal fixture 14b are fixed together with the screw 19ac (see FIG. 11), the worker can remove the lower metal fixture 14a and the upper metal fixture 14b from the float 10 only by removing the screw 19ac. Also, when fixing the lower metal fixture 14a and the upper metal fixture 14b to the float 10, the worker needs only install the screw 19ac to the lower metal fixture 14a and the upper metal fixture 14b.

Therefore, compared with the case where the lower metal fixture 14a and the upper metal fixture 14b are individually fixed to the float 10, the worker can easily perform the work of attaching and detaching the lower metal fixture 14a and the upper metal fixture 14b. Therefore, when the solar panel 50 breaks down, the worker easily replace the solar panel 50 with a new one.

As shown in FIG. 8A, a pair of the nut accommodating portions 19a are provided in the mounting portion 19 at positions corresponding to the screw holes in which the screw 19ac (see FIG. 11) of the first side metal fixture 14 is inserted. In the nut accommodating portions 19a, the front wall 16 is recessed toward the back wall 17, and the nut accommodating portions 19a accommodates and fixes the nuts. Further, the nut accommodating portions 19a are provided in a direction along the receiving portion 12 which receives the first side 52 (see FIG. 2) of the solar panel 50. In the nut accommodating portion 19a, rasp-cut nut 19ab (see FIG. 11) is accommodated and fixed. The rasp-cut nut 19ab is screwed with the screw 19ac (see FIG. 11) that screws the first side metal fixture 14.

Further, as shown in FIG. 8A, a step portion is provided in the mounting portion 19 at a portion where the lower metal fixture 14a is disposed. The step portion is approximately equal to the thickness of the lower metal fixture 14a. Since the mounting portion 19 is provided with a step portion, it can be arranged so that the lower metal fixture 14a does not protrude.

In the other drawings, illustration of this stepped portion may be omitted.

On the other hand, when viewing a position corresponding to the mounting portion 19 from the side of the back wall 17, as shown in FIG. 8B, the first recess portion 19c, in which the back wall 17 is recessed toward the side of the front wall 16, has the peripheral wall 19b is provided in the float 10.

In other words, the mounting portion 19 comprises the first recess portion 19c having the peripheral wall 19b and the nut accommodating portion 19a accommodating and fixing the nut. The first recess portion 19c is formed by recessing the back wall 17 toward the front wall 16. The nut accommodating portion 19a is formed by recessing the front wall 16 toward the side of the back wall 17.

As shown in FIG. 8B, at the other side (the right side in FIG. 8B) of the float 10 than the first recess portion 19c, the recess 19f is provided adjacent to the first recess portion 19c. This recess 19f is formed by recessing the back wall 17 towards the side of the front wall 16. The depth of the recess 19f is slightly shallower than the depth of the first recess portion 19c. When the worker carries the float 10, the worker can use the recess 19f as a handle to grasp the float 10. Therefore, since the worker can stably grasp the float 10, the float 10 can be easily transported to the water surface.

The cross-sectional structure of this portion will be described with reference to FIG. 9A. In the nut accommodating portion 19a, the bottom portion 19aa on the side of the back wall 17 is integrated with the bottom portion 19d on the side of the front wall 16 of the first recess portion 19c. A manufacturing method for realizing such integration is not particularly limited, but it can be realized by, for example, a shape of the mold for blow molding.

Therefore, the mounting portion 19 is provided with the first recess portion 19c serving as a reinforcing rib, and the nut accommodating portion 19a and the back wall 17 accommodating the rasp-cut nut 19ab (see FIG. 11) are integrated. Thus, it is unlikely to be affected by deflection. As a result, the nut accommodating portion 19*a* is hardly deformed. And the rasp-cut nut 19*ab*, which is accommodated in and fixed with the nut accommodating portion 19*a*, does not come off the nut accommodating portion 19*a*.

FIG. 9B shows a cross section at a position (the position of the line X-X in FIG. 8) between the pair of the nut accommodating portions 19*a* in the direction along the receiving portion 12 receiving the first side 52 (see FIG. 2) of the solar panel 50. As shown in FIG. 9B, the second recess portion 19*e* that is recessed toward the side of the front wall 16 is provided on the other side of the straight line connecting the pair of the nut accommodating portions 19*a* (see FIGS. 8 and 9 A). Further, the bottom portion 19*ea* which is provided in the side of the front wall 16 of the second recess portion 19*e* is integrated with the front wall 16, thereby further increasing the rigidity.

In addition, as shown in FIG. 9, the receiving portion 12 which receives the first side 52 (the other side) of the solar panel 50 has a portion where the front wall 16 and the back wall 17 are integrated. In particular, as shown in FIG. 3, the receiving portion 12 is formed so that the front wall 16 raises from the end on the other side (a first side) of the sloping portion 18 in a direction away from the back wall 17. That is, the receiving portion 12 is formed as a standing wall portion. As shown in FIG. 9, the peripheral wall 19*b* of the first recess portion 19*c* has a portion located on the standing wall portion side as the receiving portion 12, and this portion is integrated with the standing wall portion.

Therefore, the rigidity of the receiving portion 12 receiving the first side 52 (the other side) of the solar panel 50 is increased.

Even if expansion and contraction of the gas occur at a portion, where a large amount of gas (air, and so on) is present, closer to the center of the float 10 than the receiving portion 12, the deflection (deformation) due to the expansion and contraction does not affect the mounting portion 19 located outside the receiving portion 12.

In this way, the mounting portion 19 is not only considered to have high rigidity so that the deflection (deformation) itself is unlikely to occur, but even if the deflection (deformation) occurs at the other portion of the float 10, the deflection (deformation) does not affect the mounting portion 19. Therefore, the nut accommodating portion 19*a* provided in the mounting portion 19 is hardly deformed. And the rasp-cut nut 19*ab* (see FIG. 11), which is accommodated in and fixed with the nut accommodating portion 19*a*, does not come off the nut accommodating portion 19*a*.

On the other hand, as described above, the first side metal fixture 14 is fixed to the rasp-cut nut 19*ab* (see FIG. 11) provided in the mounting portion 19 which is hardly affected by the deflection. Therefore, stable fixing is realized. In addition, the first side metal fixture 14 is fixed so that the solar panel 50 is cramped vertically by the lower metal fixture 14*a* and the upper metal fixture 14*b*. Therefore, more stable fixing is realized.

For example, when a strong wind blows in between the solar panel 50 and the float 10, a strong force is applied in a direction to lift the solar panel 50. Then, if the solar panel 50 is fixed so as to be pressed from only the upper side, the solar panel 50 may move. In the present embodiment, the lower side and the upper side of the solar panel 50 can be firmly fixed. Therefore, occurrence of such movement of the solar panel 50 is suppressed, and stable fixing can be realized.

More specifically, as shown in FIG. 1, the solar panel 50 is tilted on the float 10. Further, the second side 51 of the solar panel 50 is located farther from the float 10 than the first side 52. Therefore, the wind enters between the solar panel 50 and the float 10 from the second side 51 of the solar panel 50.

On the other hand, the first side 52 of the solar panel 50 is arranged on the float 10 so as to have substantially no gap with the float 10. Therefore, the wind entering between the solar panel 50 and the float 10 can not pass through between the solar panel 50 and the float 10, and the wind pushes up the first side 52 of the solar panel 50. As a result, the first side metal fixture 14 is stressed to push upward.

On the upper side of the solar panel 50, a glass portion 50*a* (see FIG. 2) of the solar panel 50 is located. Thus, the upper metal fixture 14*b* (see FIG. 2) of the first side metal fixture 14 is not fixed with screwing to the solar panel 50, but the upper metal fixture 14*b* functions as a means to clamp the solar panel 50 between the upper metal fixture 14*b* and the lower metal fixture 14*a*. The solar panel 50 is cramped so as to press the solar panel 50 to the lower metal fixture 14*a* (see FIG. 2) side of the first side metal fixture 14.

Thus, the force that pushes up the solar panel 50 upward due to influence of the wind causing the solar panel 50 to move upward. When a gap between the upper metal fixture 14*b* and the lower metal fixture 14*a* expands by this force, the upper metal fixture 14*b* can not stably fix the solar panel 50.

On the other hand, the lower metal fixture 14*a* can be fixed to the solar panel 50 with screwing it against the base 54 provided on the solar panel 50. Therefore, even if the solar panel 50 tries to move upward, it is possible to maintain the fixed state of the solar panel 50 stably. Therefore, according to the present embodiment, it is possible to maintain the fixed state of the solar panel 50 stably.

As shown in FIG. 2, in the present embodiment, the first side 52 of the solar panel 50 is fixed to the float 10 at both ends of the float 10 in the direction along the receiving portion 12. Here, the first side 52 of the solar panel 50 is fixed to the float 10 with one and the other first side metal fixtures 14. And the receiving portion 12 receives the first side 52 (the other side) of the solar panel 50.

In this manner, by fixing at both ends, it is possible to realize a stable fixing in which wobbling does not occur on the right and left. Additionally, by fixing at the center, it is also possible to realize more stable fixing.

By the way, the float 10 described above is not used as a single unit. However, as shown in FIG. 10, the assembly float portion 120 (see FIG. 14) is formed by joining a large number of the floats 10 with the passage joints 60 serving as a passage for performing maintenance.

In particular, as shown in FIG. 1, the float 10 has a pair of engaging protrusions 61 formed on the first side 10*a* of the float 10 on the side close to the supporting portion 11. The engaging protrusion 61 engages with the passage joint 60 (see FIG. 10). Further, the passage joint 60 has an engaging recess (not shown) engaged with the engaging protrusion 61 on the back side.

Also, the float 10 has a bolt hole 62*a* (see FIG. 3) through which the connecting bolt 62 connecting the passage joint 60 passes. The bolt hole 62*a* is provided on the side closer to the receiving portion 12 which receives the first side 52 (the other side) of the solar panel 50 and on the side of the second side 10*b* of the float 10. Further, as shown in FIG. 10, when a part of the float 10 on the second side 10*b* side and a part on the first side 10*a* are overlapped, the float 10 also has a bolt hole 62*b* (see FIG. 1). The bolt hole 62*b*, corresponding to the bolt hole 62*a*, is provided in the first side 10*a* of the float 10. As shown in FIG. 10, the passage joint 60 has the bolt hole 63 corresponding to the bolt hole 62a and the bolt hole 62b.

Therefore, the passage joint 60 is engaged with the one float 10 at the engaging protrusion 61 of the float 10 on one side. In addition, the bolt hole 62a (see FIG. 1) on the first side 10a side of the float 10 and the bolt hole 62a on the second side 10b side of the float 10 and the bolt hole 63 in the passage joint 60 are connected with bolt 62. Thereby, a large number of the floats 10 are connected via the passage joint 60.

As shown in FIG. 10, a pair of the passage joints 60 are symmetrically arranged in a direction orthogonal to an arrangement direction (see the Z axis) of a pair of connected floats 10 (refer to the W axis).

One end 60a of one of the passage joints 60 (see 60A) is connected to the float 10 on one side and the float 10 on the other side.

Also, the other end 60b of one of the passage joints 60 is connected to one float 10 different from one of the above and the other float 10 different from the above.

Also, the other end 60b of the other of the passage joints 60 (see 60B) is connected to the float 10 on one side and the float 10 on the other side.

Also, one end 60a of the other of the passage joint 60 (see 60B) is connected to the one float 10 and the other float 10.

In this way, the assembly float portion 120 (see FIG. 14), which will be described later, is constructed by connecting the float 10 one after another via the passage joint 60.

This passage joint 60 is a part that the worker walk during maintenance and so the load is applied. Therefore, when the float 10 has low rigidity, the float 10 deforms by receiving the worker's load.

However, as described above, not only the mounting portion 19 has high rigidity but also the float 10 itself has high rigidity. Therefore, even when receiving such the load, it is difficult for deflection (deformation) to occur. Thus, when the worker pass through the passage joint 60, shaking hardly occurs, walking is easy, and workability of worker is improved.

Also, the mounting portion 19 with enhanced rigidity is less prone to deformation even under such the load. Therefore, due to work such as maintenance, deformation of the mounting portion 19, where the first side metal fixture 14 is fixed, is avoided. Also, it is suppressed that rasp-cut nut 19ab (see FIG. 11) provided in the mounting portion 19 is removed. As a result, it is possible to fix the solar panel 50 stably.

Modified Configuration: Fixing on the Other Side of the Solar Panel

In the above description shows that the lower metal fixture 14a (see FIG. 2) of the first side metal fixture 14 is screw-fixed to the base 54 (see FIG. 2) provided in the solar panel 50.

However, it is necessary to fix the lower metal fixture 14a to the base 54 with screw. And when working on the float 10 placed on the water surface, the task of fixing the lower metal fixture 14a to the surface of the base 54 located under the solar panel 50 is poor workability. Therefore, in the embodiment, workability is further improved by adopting the configuration described below.

Figure 11:
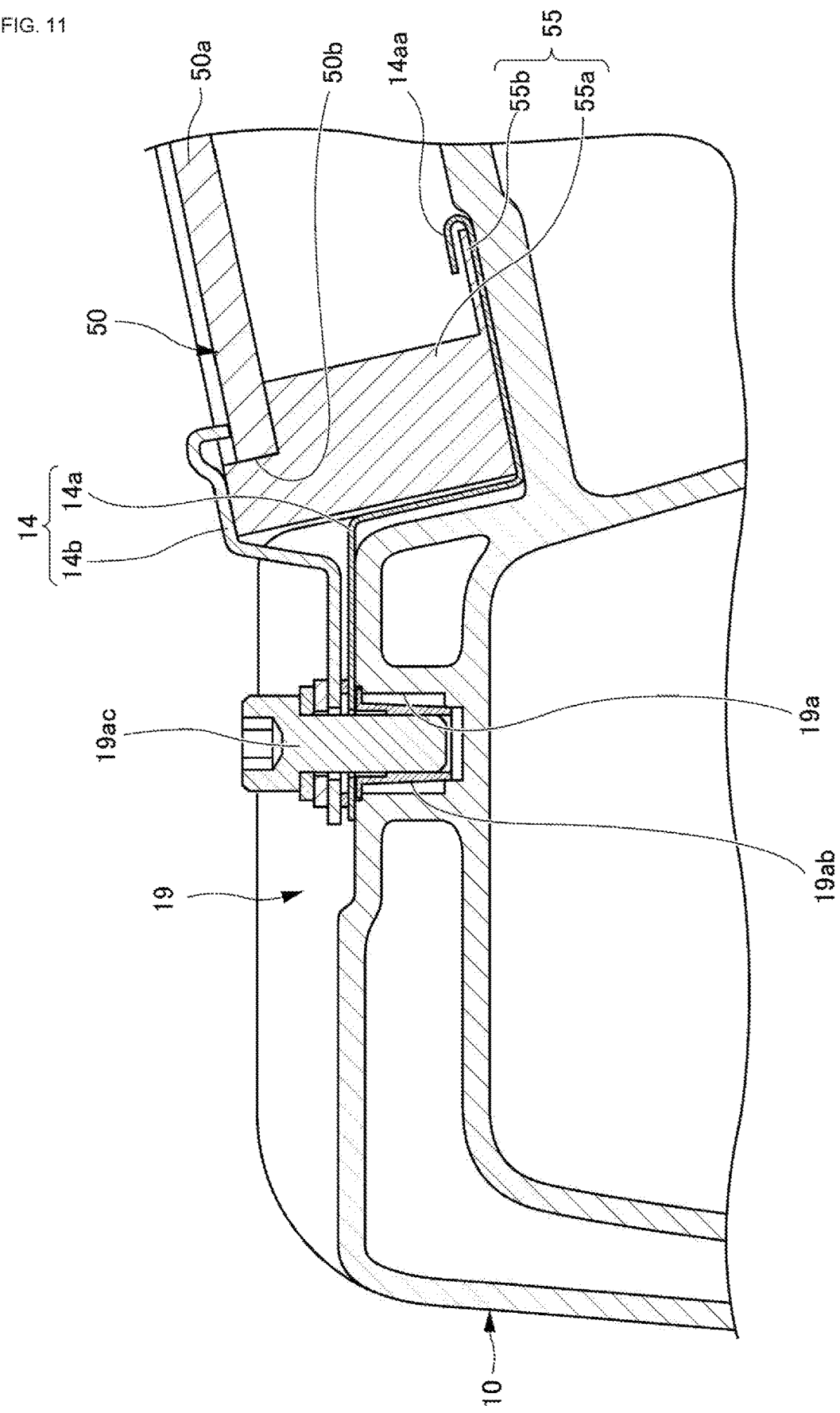
FIG. 11 is a cross-sectional view for explaining a modification of fixation on the other side of the solar panel according to the embodiment of the present invention.

FIG. 11 is a cross-sectional view for explaining a modified configuration of the fixing on the first side 52 (the other side) of the solar panel 50. More specifically, FIG. 11 is a cross-sectional view of a portion of the periphery of the mounting portion 19 when it is cut across the nut accommodating portion 19a. FIG. 11 shows a state in which the solar panel 50 is fixed to the float 10 with the first side metal fixture 14.

Here, one of the nut accommodating portions 19a is one of a pair of the nut accommodating portions 19a (see FIG. 3B) accommodating the rasp-cut nut 19ab of the mounting portion 19 to which the first side metal fixture 14 is attached.

In this modified configuration, the lower metal fixture 14a of the first side metal fixture 14 is different from that of the present embodiment, and other configurations are the same as those described above.

As shown in FIG. 11, the solar panel 50 is provided with the frame 55. The frame 55 has a panel receiving portion 55a and the engaging portion 55b.

The panel receiving portion 55a is provided along the outer periphery 50b of the glass portion 50a of the solar panel 50 and is configured to receive the glass portion 50a.

The engaging portion 55b is formed so as to extend from the end of the panel receiving portion 55a located on the opposite side of the glass portion 50a of the solar panel 50 to an inside of the solar panel 50 substantially parallel to the glass portion 50a On the other hand, the lower metal fixture 14a of the first side metal fixture 14 is provided with a U-shaped the hook portion 14aa formed at one side so as to be folded upward. Therefore, the lower metal fixture 14a is engaged with the solar panel 50 by engaging the hook portion 14aa with the engaging portion 55b provided in the solar panel 50. Since, the lower metal fixture 14a is engaged with the solar panel 50, the lower metal fixture 14a does not come off even if the solar panel 50 tries to move upward due to wind.

In this modified configuration, it is only necessary to engage the hook portion 14aa with the engaging portion 55b without screwing. Therefore, the workability of attaching the lower metal fixture 14a to the solar panel 50 is improved.

In this modified configuration, the structure corresponding to the hook portion 14aa on the solar panel 50 side (the engaging portion 55b) is provided in the frame 55 provided in the solar panel 50. The base 54 described above may have such the structure (the engaging portion 55b).

Although the configuration for installing the solar panel 50 in the float 10 has been described above, the above configuration is an example.

For example, in the above, the recess 40 has truncated conical recess portions 41, 42, 43 which taper towards the front wall 16. In the recess 40, the truncated conical recess portions 41, 42, 43 are provided at both ends and a center along the supporting portion 11. The groove-shaped recesses 44, 45 connects the truncated conical recess portion 41, 42, 43 in the direction toward the side of the front wall 16.

This configuration is an example of the recess 40, but it is not limited to this configuration. The shape of a part of the recess 40 may be changed.

In the above description, the recess 40 is such that the width of the recess 40 in the direction (Z axis direction) along the supporting portion 11 is substantially the same as the width of the supporting portion 11.

However, a plurality of recesses having a width smaller than the width of the supporting portion 11 may be aligned in the direction along the supporting portion 11.

Furthermore, in addition, in the above, part of the bottom of the recess 40 (in the back wall 17 forming the recess 40) was integrated in the front wall 16, but all of this bottom may be integrated with the front wall 16.

Further, in the above description, the base 53 and the base 54 are shown as being provided in a part of the outer periphery 50b of the solar panel 50 but may be the base having a structure similar to the frame 55 covering the entire outer periphery 50b.

Configuration for Mooring the Float

Next, a configuration in which the solar panel 50 is not installed and which is used as a part of a passage and is anchored to an anchor rope will be described.

The float 10 of the present embodiment has the annular float portion 30 having the opening 26 as described above. In particular, as described above, the opening 26 is formed by combining the front wall 16 and the back wall 17.

The opening 26 is formed by raising the supporting portion 11, which supports the second side 51 (one side) of the solar panel 50, toward the side of the front wall 16 so as to open the opening 26 with the side 24, connected to the inner wall at one end (a second end) of the opening 26, as the hinge.

Then, as shown in FIG. 6, when the supporting portion 11 is raised so as to form the opening 26, the worker can access from the opening 26 to the region F provided on the side of the back wall 17 in the middle of the float 10.

The central region F of the float 10 is positioned around the point of intersection when a diagonal line is drawn from the four corners of the rectangle the float 10, and the central region F is nearly at the center of gravity. The center of gravity is a position where the float 10 does not tilt and the posture stability is high.

By fixing the mooring component such as the anchor rope at the center of gravity, the tensile force of the mooring component is applied to the position of the center of gravity when the float 10 tries to move by the strong wind. Therefore, the deterioration of the attitude of the float 10 is avoided.

Also, if the worker rides the edge of the float 10, in some cases, the float 10 may tilt and the worker may drop into the water. If the worker does not ride near the edge of the float 10 and it is impossible to work to fix the mooring component of the anchor rope to the float 10, workability is very poor.

In consideration of such dropping into the water, it is also possible to work closer to the edge of the float 10 by a boat near the edge. However, even in this case, working from the ship is required, so workability is poor.

On the other hand, since the central region F of the float 10 is located at the center of gravity position with high posture stability as described above, the balance of the float 10 is not likely to collapse even if the worker the worker rides near the central region F.

Therefore, if the mooring component such as the anchor rope is fixed to the central region F of the float 10, when the worker fixes the mooring component such as the anchor rope to the float 10, the balance of the float 10 does not collapse. Therefore, the worker easily can fix the mooring component of the anchor rope to the float 10.

Therefore, the mooring portion 70 for mooring the mooring component of the anchor rope is provided in an area adjacent to the central region F of the float 10. The mooring portion 70 will be described below.

As shown in FIG. 5, the mooring portion 70 is provided adjacent to the opening 26 (near the other end). In other word, the mooring portion 70 is provided on the edge 26a of the opening 26 facing the supporting portion 11 raised across the opening 26.

As shown in FIG. 5, the mooring portion 70 is formed by recessing the front wall 16 toward the side of the back wall 17. As shown in FIG. 6, the mooring portion 70 is formed by recessing the back wall 17 toward the side of the front wall 16. That is, the mooring portion 70 is configured to enhance the rigidity by combining the front wall 16 and the back wall 17.

FIG. 12 is a cross-sectional view taken along line D-D in FIGS. 3B and 4B.

Figure 12A:
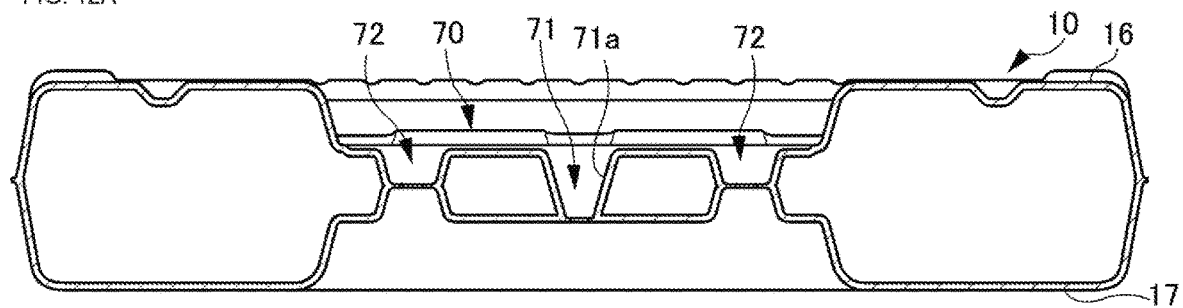
FIG. 12A is a cross-sectional view taken along the line D-D in FIGS. 3B, 4B.

FIG. 12A is a view showing a state in which no component for fixing the mooring component such as eyebolt 80 is attached.

Figure 12B:
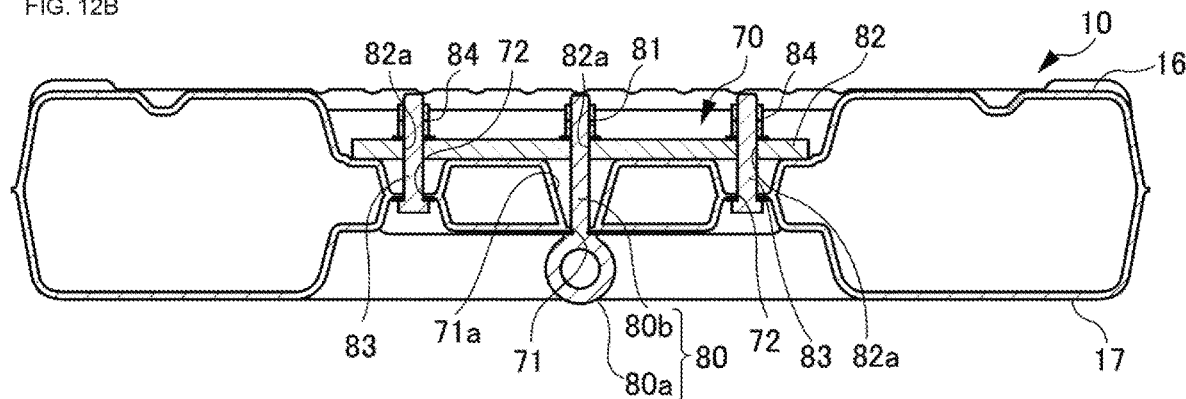
FIG. 12B is a view showing a state in which a component for fixing the mooring component such as the eyebolt is attached so that the ring of the eyebolt is positioned on the rear wall side.

FIG. 12B is a view showing a state in which a component for fixing the mooring component such as the eyebolt 80 is attached so that the ring 80a of the eyebolt 80 is positioned on the side of the back wall 17.

Figure 12C:
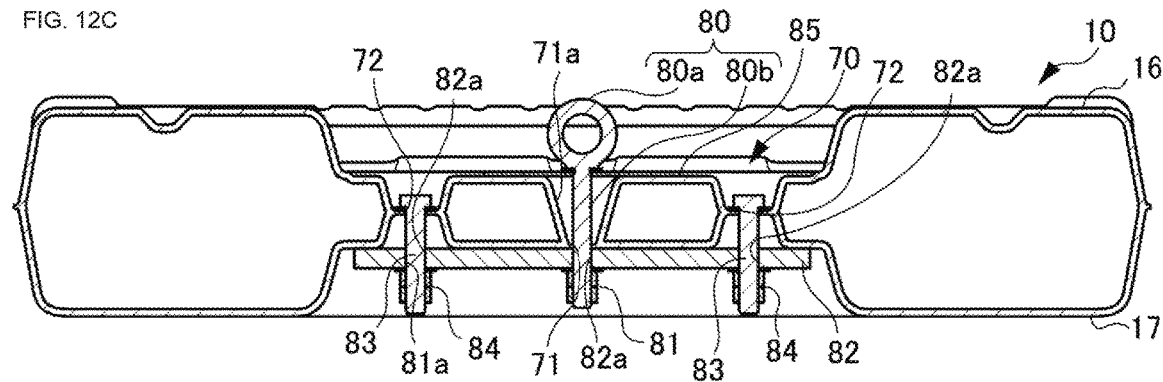
FIG. 12C is a view showing a state in which a component for fixing the mooring component such as the eyebolt is attached so that the ring of the eyebolt is positioned on the surface wall side.

FIG. 12C is a view showing a state in which parts for fixing the mooring component such as eyebolt 80 are attached so that the ring 80a of the eyebolt 80 is located on the side of the front wall 16.

As shown in FIGS. 12B and 12C, the float 10 includes an eyebolt 80 and a nut 81, as accessories.

The eyebolt 80 has the ring 80a that fixes the mooring component such as the anchor rope. The nut 81 is screwed into a thread groove of the eyebolt 80. Here, the eyebolt 80 has a base portion 80b extending from the ring 80a, and the base portion 80b is provided with the thread groove at a tip of the base portion 80b. Correspondingly, the mooring portion 70 has the first through hole 71 in which the base portion 80b of the eyebolt 80 is inserted.

Also, as shown in FIGS. 12B and 12C, the float 10 includes the first fixing portion 82, a pair of the first bolts 83, and a pair of first nuts 84, as accessories.

The first fixing portion 82 is arranged on the side of the front wall 16 or the side of the back wall 17 of the mooring portion 70. The first bolt 83 fixes the first fixing portion 82 to the mooring portion 70. First nut 84 meshes with the first bolt 83.

Correspondingly, the mooring portion 70 has a pair of the second through holes 72 in which the first bolt 83 is inserted, and the first through hole 71 is sandwiched between a pair of the second through holes 72.

The first fixing portion 82 has three through holes 82a provided corresponding to the first through hole 71 and the second through hole 72, respectively. The base portion 80b and the first bolt 83 of the eyebolt 80 are inserted in the through holes 82a.

As shown in FIGS. 3B, 4B, 5 and 6, the first through hole 71 and the second through hole 72 are provided in the mooring portion 70. The first through hole 71 and the second through hole 72 are aligned in the direction along the edge 26a (see FIG. 5) on the other side (a first side) of the opening 26.

A configuration for mooring the mooring component such as an anchor rope comprising such accessory parts will be described.

FIG. 12 assumes a situation to be described below. That is, the anchor is submerged at the bottom of the pond or the lake, and one end of the mooring component such as the anchor rope is connected to this anchor, and the other end of the mooring component is anchored to the float 10.

Thus, the ring 80a of the eyebolt 80 is arranged so as to be positioned on the side of the back wall 17 on the water surface side.

In this case, when the assembly float portion 120 (see FIG. 14) moves due to wind, the force, of the mooring component such as the anchor rope to hold the float 10, acts as a force pulling the eyebolt 80 from the side of the front wall 16 to the side of the back wall 17 (lower side of the figure).

At this time, if stress concentrates on the local position of the float 10 where the eyebolt 80 is located, the float 10 made of resin may be damaged.

Therefore, in this embodiment, as shown in FIG. 12B, the float 10 is provided with the thick first fixing portion 82 on the side of the front wall 16 of the mooring portion 70. Then, after placing the base portion 80b of the eyebolt 80 so as to pass through the first fixing portion 82, the worker screw the nut 81 onto the tip of the base portion 80b of the eyebolt 80. Then, the worker fix the first fixing portion 82 on the front wall 16 of the mooring portion 70. This causes the pulling force to distribute throughout the mooring portion 70 via the first fixing portion 82.

In addition, since the first fixing portion 82 directly receives the pulling force of the mooring component such as the anchor rope, it is preferable that the thickness of the first fixing portion 82 is thick and the strength as a material of the first fixing portion 82 is high. It is preferable that the first fixing portion 82 a is made of, for example, a metal plate.

However, the first fixing portion 82 may be provided as necessary, and it is not necessarily required to provide it.

Therefore, it is avoided that the pulling force of the mooring component such as the anchor rope concentrates on the local position of the mooring portion 70. Therefore, the mooring portion 70 is prevented from being broken.

In the present embodiment, the first fixing portion 82 is fixed to the mooring portion 70 with a pair of the first bolts 83 and the first nuts 84 with the eyebolt 80 interposed therebetween. This stabilizes the fixation of the first fixing portion 82.

On the other hand, one end of the mooring component such as the anchor rope may be fixed to the land around the pond or the lake instead of connecting to the anchor at the bottom of the pond or the lake. In this case, it is more convenient for ring 80a of eyebolt 80 to be located on the side of the front wall 16 of the float 10.

In this way, if the ring 80a of the eyebolt 80 is placed on the side of the front wall 16, the force, of the mooring component such as the anchor rope to hold the float 10, will be reversed from the previous one. Therefore, as shown in FIG. 12C, it is preferable to place the first fixing portion 82 on the side of the back wall 17 of the mooring portion 70.

In the present embodiment, the first through hole 71, which is provided in the mooring portion 70 that passes the base portion 80b of the eyebolt 80, includes the taper portion 71a formed by recessing the front wall 16 toward the side of the back wall 17, and the taper portion 71a is tapered in the direction from the front wall 16 to the side of the back wall 17. That is, the present embodiment has a reinforcing rib structure.

Therefore, when the first fixing portion 82 is arranged on the side of the back wall 17, in order to prevent the ring 80a of the eyebolt 80 from falling into this taper portion 71a, as shown in FIG. 12C, the float 10 comprises the second fixing portion 85, which is provided on the front wall 16 of the mooring portion 70 so as to cover the taper portion 71a, as the accessory.

However, when the mooring component such as the anchor rope holds the float 10, not too strong force is applied to the second fixing portion 85. Therefore, as shown in FIG. 12C, the second fixing portion 85 may not be as thick as the first fixing portion 82.

The second fixing portion 85 also needs to penetrate the base portion 80b of the eyebolt 80. Therefore, the through hole, in which the base portion 80b of the eyebolt 80 is inserted, is formed in the second fixing portion 85 at the position corresponding to the first through hole 71.

In the above, the mooring component such as the anchor rope fixed underwater and on land was conveniently explained by fixed location. Here, in the assembly float portion where a large number (plural) of floats 10 are gathered, the mooring components may include both the mooring component fixed in water and the mooring component fixed on land.

That is, in the assembly float portion, the mooring component such as the anchor rope is connected to a plurality of places so as to be moored stably. Thus, it goes without saying that the following configuration may be adopted in the present embodiment. That is, some of the plurality of places are connected to the mooring component such as the anchor rope fixed to the anchor in the water, and the rest of the plurality of places of the anchor rope fixed to the mooring component on land.

Here, for example, Patent Document 1 discloses that fixing ear are provided at the four corners of the float, and fixing ears are also provided at the four corners of a connecting element. A large number of floats are gathered by connecting these fixing ears with fastening pins.

In this case, when the floats are gathered so that the outer shape is rectangular, the fixing ears remain only at the four corners of the gathered float portion. Therefore, only four anchor ropes can be connected to the gathered float portion.

In this way, when the mooring component such as the anchor rope is used for the connecting structure of the float, the mooring component such as the anchor rope cannot be moored to portions where the connection structure is arranged.

In the present embodiment, on the other hand, apart from the connecting structure for gathering the float 10, the mooring portion 70 is provided which anchors the mooring component such as the anchor rope.

Therefore, if the float 10 constituting the assembly float portion 120 (see FIG. 14) is used for the passage, any of this floats 10 can moor the mooring component such as the anchor rope. Therefore, the degree of freedom of installation of the anchor rope is extremely high.

In the case of Patent Document 1, as described above, there are cases where connection to the anchor rope can be performed only at four corners. Then, each anchor rope is responsible for 25% of the total force when the gathered float portion moves. Even if one anchor rope breaks, 33% of the total force, when the gathered float portion moves, will be added to each remaining anchor rope. As a result, the fracture probability of the anchor rope rises, so there is concern about mooring stability.

However, the float 10 of the present embodiment can be moored to the mooring component such as the anchor rope of any floats 10 which are used for the passage. Therefore, it is possible to greatly increase the number of the mooring components such as the anchor rope for mooring the assembly float portion 120 (see FIG. 14). As a result, the force on each mooring component can be reduced. Therefore, the probability of damaging the mooring component such the anchor rope can be greatly reduced. Also, even if one of the mooring components is damaged, it can be avoided that large force is added to the remaining mooring component. Therefore, high anchoring stability of the assembly float portion 120 (see FIG. 14) can be realized.

This also means below. Even if the weight of the anchor connected to the mooring component such as the anchor rope is reduced, by increasing the number of the mooring components such as the anchor rope connected to the assembly float portion, the assembly float portion can be stably moored.

Therefore, by reducing the weight of the anchor, when the assembly float portion has to be removed, the worker can easily lift the anchor from underwater.

The force per point applied to the mooring portion 70 of the float 10, to which the mooring component such as the anchor rope is moored, is also reduced. Therefore, the probability, that the mooring component such as the anchor rope is damaged, can be reduced. Furthermore, the probability of breakage of the mooring portion 70 can also be greatly reduced.

Also, the mooring portion 70 is provided in a center side position of the float 10 where the float 10 can maintain stable posture without leaning and the float 10 can keep its posture even if the force to hold the float 10 on the mooring component such as the anchor rope is added. Therefore, mooring of the float 10 with stability is realized.

On the other hand, in the case where the mooring portion 70 is provided at the center side position of the float 10, if the opening 26 accessible there is not present, it is heavy burden for the worker to moor the mooring component such as the anchor rope to the mooring portion 70.

However, in the present embodiment, the opening 26 exists in a vicinity of the mooring portion 70. Therefore, it is easy to access the side of the back wall 17 of the mooring portion 70. Also, when the ring 80a of the eyebolt 80 is provided on the side of the back wall 17, the worker can easily moor the mooring component such as the anchor rope to the ring 80a.

Figure 14:
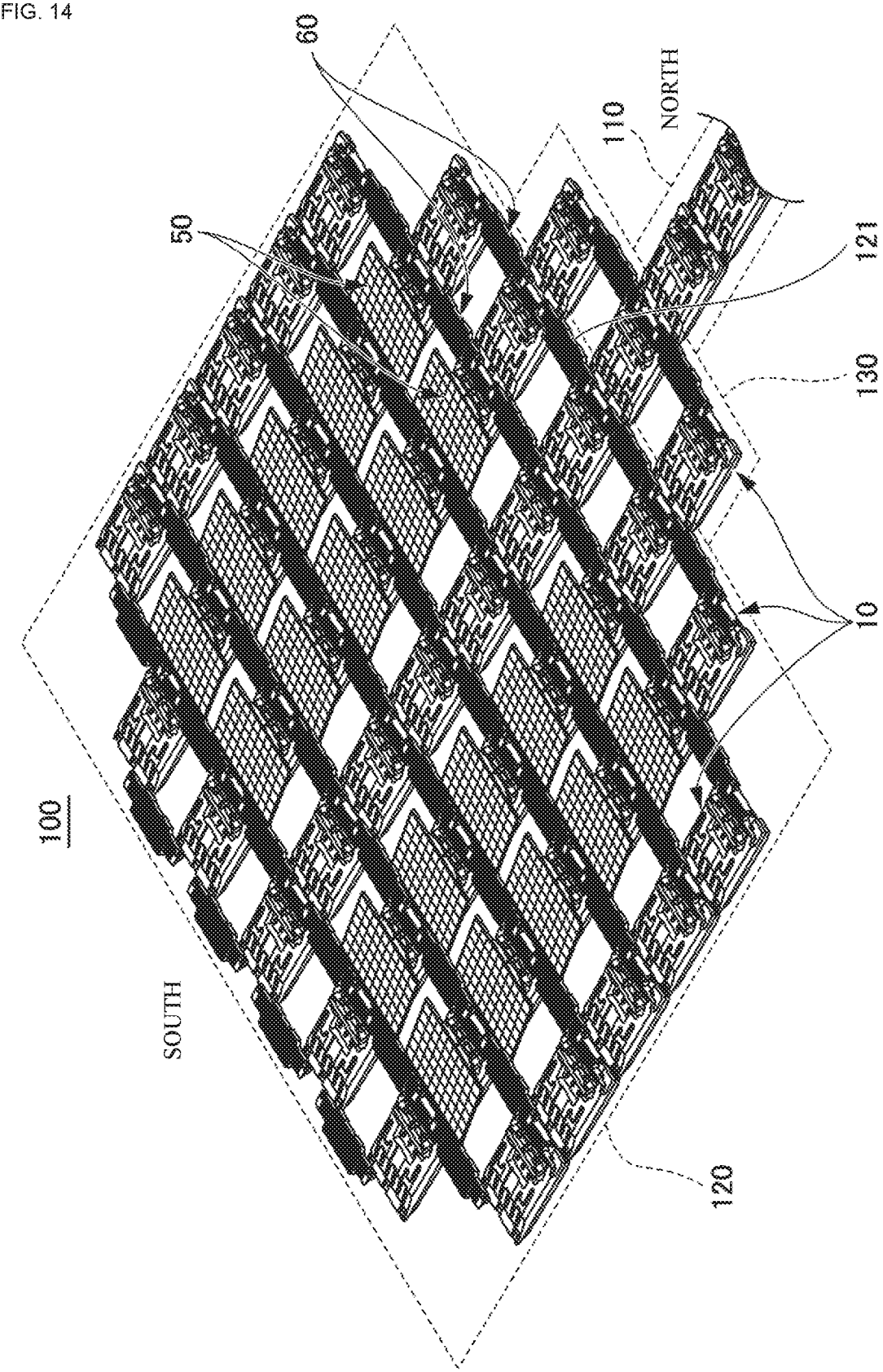
FIG. 14 is a view showing the float assembly connecting the floats according to the embodiment of the present invention.

Furthermore, if the float 10 without installing the solar panel 50 is provided, the worker can easily moor the mooring component such as the anchor rope to the float 10, even if, which is on the center side of the assembly float portion 120 (see FIG. 14).

Therefore, in the assembly float portion 120 (see FIG. 14) comprising the floats 10 of the present embodiment, the worker can moor the mooring component such as the center side of the assembly float portion 120 as well as the anchor rope to the around of the assembly float portion 120.

The float 10 of the present embodiment can also be used as a passage. In this use mode, it is preferable that the opening 26 be closed. On the other hand, when the worker accesses the side of the back wall 17 of the mooring portion 70, it is preferable for the worker to easily open the opening 26. As described below, if the opening 26 can be opened and closed easily, the opening 26 can be closed to improve convenience as the passage.

Also, when inspecting the mooring component such as the anchor rope, the worker can easily open the opening 26. Therefore, the burden for the inspection work is reduced.

Therefore, in the present embodiment, the opening 26 can be easily closed and opened. Hereinafter, configurations capable of easily closing and opening this opening 26 are described.

Figure 13:
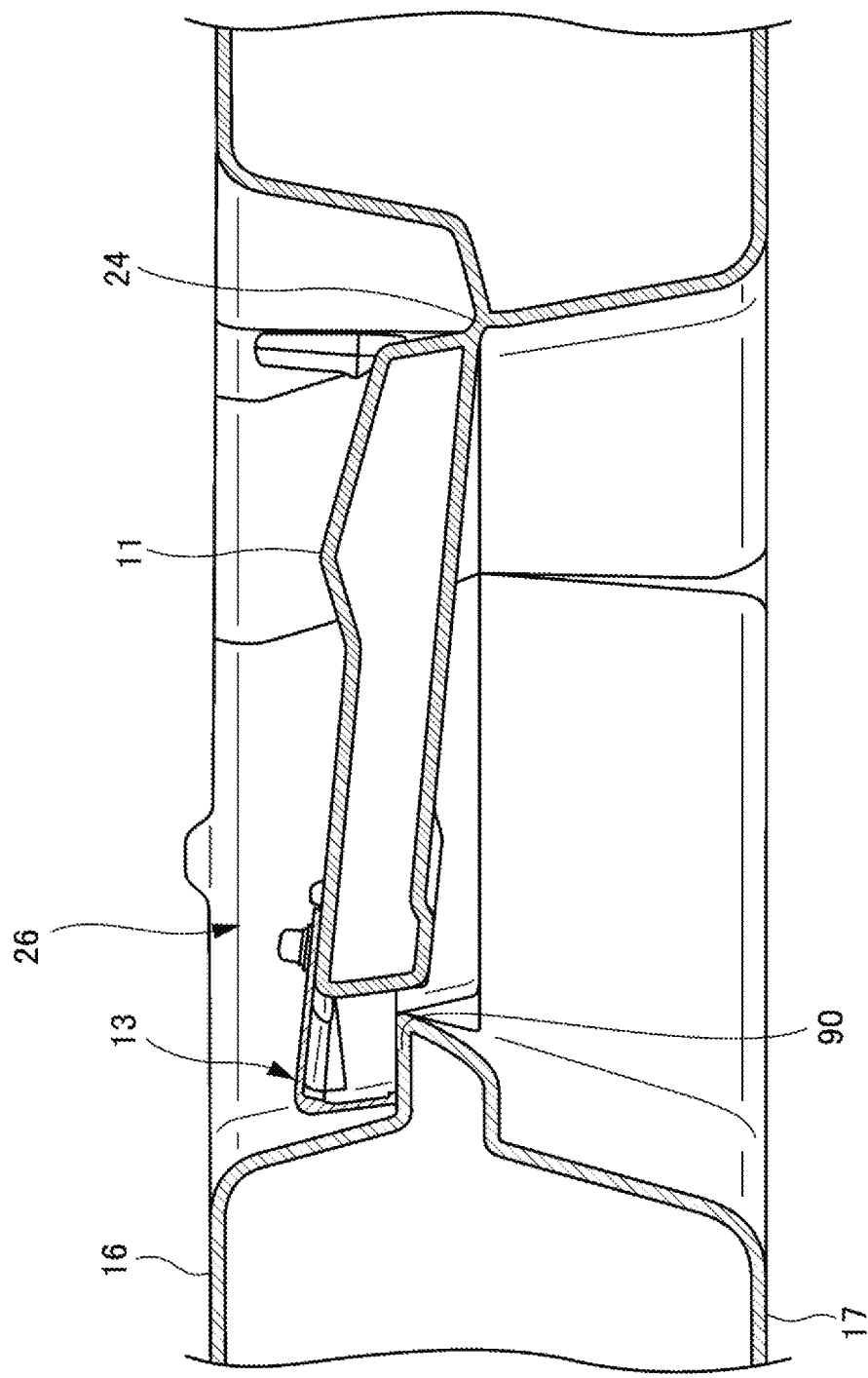
FIG. 13 is a cross-sectional view for explaining the opening and closing mechanism of the opening according to the embodiment of the present invention.

FIG. 13 is a cross-sectional view for explaining the opening and closing mechanism of the opening 26.

In particular, it is a cross-sectional view taken along line E-E of FIG. 10 taken along the line E-E.

In FIG. 10, the second side metal fixture 13 is not attached to the supporting portion 11.

FIG. 13 shows a state in which the second side metal fixture 13 is attached to the supporting portion 11.

As described above, the opening 26 is formed by raising the supporting portion 11. Thus, an inner shape of the opening 26 and an outer shape of the supporting portion 11 have substantially the same shape. Therefore, when the opening 26 is blocked by the supporting portion 11 and a force is applied to push the supporting portion 11 toward the back wall 17, the supporting portion 11 moves easily from a position where the opening 26 is closed to the side of the back wall 17.

Therefore, as shown in FIGS. 10 and 13, when the supporting portion 11 is raised with the side 24 as the hinge and the opening 26 (see FIG. 5) is opened, a vicinity of both ends of an edge 26a (see FIG. 5) on the other side of the opening 26 is provided with a stopper portion 90 which receives a part (both ends) of the second side metal fixture 13. The other side of the opening 26 corresponds to a side opposed to the side 24 as the hinge.

When the worker recline the supporting portion 11 so as to block the opening 26 in a state where the second side metal fixture 13 is attached to the supporting portion 11, the stopper portion 90 receives a part (both ends) of the second side metal fixture 13.

By having such the stopper portion 90 in the float 10, when the worker are trying to block the opening 26 by the supporting portion 11, and the force is applied to push the supporting portion 11 towards the side of the back wall 17, the supporting portion 11 does not move from the position where the opening 26 is closed to the side of the back wall 17.

Moreover, the second side metal fixture 13 is the accessory for fixing the solar panel 50, and it is only using the accessories thereof, so there is no need to newly increase parts.

On the other hand, as shown in FIG. 1, the supporting portion 11 is provided with a finger insertion recess 91. The finger insertion recess 91 is provided in a surface 11a of the supporting portion 11, and the finger insertion recess 91 is configured to be inserted a finger between the fixing portion 13b and the supporting portion 11. The surface 11a faces one side of the float 10 in the state in which the supporting portion 11 is raised the side of the front wall 16.

Therefore, when the worker tries to raise the supporting portion 11 toward the front wall 16 from a state in which the supporting portion 11 is tilted so as to close the opening 26, the worker inserts finger between the fixing portion 13b and the supporting portion 11, and just pulls it to bring up the supporting portion 11 to the side of the front wall 16. Thus, the worker can easily open the opening 26.

In the above, the configurations, for mooring the mooring component such as the anchor rope on the float 10 where the solar panel 50 is not installed, is described.

When the solar panel 50 is installed in the float 10, the burden of mooring the mooring component such as the anchor rope becomes hard. However, the worker can moor the mooring component such as the anchor rope to the float 10 where the solar panel 50 is installed.

Therefore, if necessary, the mooring component such as the anchor rope may be moored to the float 10 where the solar panel 50 is installed.

The Float Assembly

Next, the float assembly 100 formed using the float 10 and the passage joint 60 explained above are described. FIG. 14 is a diagram showing the float assembly 100 connected with the floats 10 of the present embodiment.

As shown in FIG. 14, the float assembly 100 includes the pier 110, the assembly float portion 120, and the connected float portion 130.

The pier 110 includes the linear float portion formed by connecting the plurality of the floats 10 arranged in a line.

The assembly float portion 120, to which the solar panel 50 is provided, is formed by connecting the plurality of the floats 10.

The connected float portion 130 is configured to connect the assembly float portion 120 and the pier 110. The connected float portion 130 is formed by connecting the plurality of the floats 10.

The pier 110 and the connected float portion 130 are constituted by the floats 10 having the same structure as the float 10 used for the assembly float portion 120. Therefore, there is no need to design another float for pier 110 and the connected float portion 130. Therefore, it is possible to reduce the manufacturing cost of the float for constituting the pier 110 and the connected float portion 130.

It is to be noted that the assembly float portion 120 shown in FIG. 14 is merely an example, and as mentioned at the beginning, the assembly float portion 120 actually includes hundreds, thousands of the float 10, the passage joint 60, and a large number of the solar panel 50 are arranged.

Also, unlike the assembly float portion 120 where the solar panel 50 is placed, the solar panel 50 is not placed on the pier 110 or the connected float portion 130. Therefore, it is unnecessary to cut the remaining three sides 21, 22, 23, leaving the side 24 (see FIGS. 3 and 4) as the hinge of the supporting portion 11.

Without this cutting work, it is unnecessary to install the second side metal fixture 13 in order to prevent the supporting portion 11 from falling into the side of the back wall 17 (see FIG. 13). Therefore, the supporting portion 11 does not tilt, so that the worker easily walks on the float 10. In addition, cutting work of the supporting portion 11 and attaching work of the second side metal fixture 13 can be omitted.

Hereinafter, each part (the pier 110, the assembly float portion 120 and the connected float portion 130) of the float assembly 100 are described in detail.

The assembly float portion 120 is a portion for installing the solar panel 50 in the float assembly 100. Then, as shown in FIG. 14, the solar panel 50 is not installed in part of the floats 10, and the part of the floats 10 are used, for example, as the passage traversing the periphery or the center of the assembly float portion 120.

This passage is a part where the worker walks during maintenance and, this passage is a place where the cable connected to the solar panel 50 is laid. On the other hand, in order to be able to launch such the cable toward the land, the float assembly 100 of the present embodiment comprises the pier 110 including the linear float portion where the floats 10 are connected linearly.

FIG. 14 shows the pier 110 including the linear float portion where the floats 10 are connected linearly. However, a shape of the linear float portion is not limited to a linear shape. The pier 110 may include the linear float portion where the floats 10 are connected to form L-shaped.

The connection portion between the pier 110 and the assembly float portion 120 is subject to stress and breakage when the float assembly 100 is about to move due to the wind. Thus, the assembly float portion 120 and the pier 110 are not directly connected, and the assembly float portion 120 and the pier 110 are connected via the connected float portion 130.

In particular, in the connected float portion 130, the number of the float 10 in the width direction is larger than the number of the float 10 in the width direction of the pier 110. And the number of the float 10 in the width direction is smaller than the number of the float 10 of the side 121 of the assembly float portion 120 connected to the connected float portion 130.

Thus, the connected float portion 130 plays a role of strengthening the rigidity of the connecting part and dispersing the stress.

In the present embodiment, the connected float portion 130 having only one row (also referred to as one stage) of the floats 10 connected in the width direction is shown, but the connected float portion 130 may have a plurality of the stages of the floats 10 connected in the width direction.

In this case, it is preferable from the viewpoint of stress dispersion that the connected float portion 130 constitutes each stage so that the number of the floats 10 in the width direction increases from the pier 110 side to the assembly float portion 120 side.

In the float assembly 100 configured as described above, the pier 110 is provided from the assembly float portion 120 where the solar panel 50 is installed toward the land side. Therefore, the cable can be laid on the pier 110, and the worker can easily perform work such as maintenance of the cable.

Moreover, in this embodiment, unlike laying the cable in the water, it is not necessary to hang the cable down to the bottom of the water. Therefore, this embodiment can make the cable shorten.

If the pier 110 is connected to the east side or the west side of the assembly float portion 120, strong stress (stress of the connected float portion 130) is generated between the assembly float portion 120 and the pier 110 when the assembly float portion 120 is exposed to strong winds and waves. Thus, for installing the float assembly 100, it is preferable to connect the pier 110 with the assembly float portion 120 so that the pier 110 is positioned on the north side or the south side.

On the other hand, the float assembly 100 shown in FIG. 14 is merely an example. And present embodiment may comprise the float assembly 100 as shown in FIG. 15.

Figure 15:
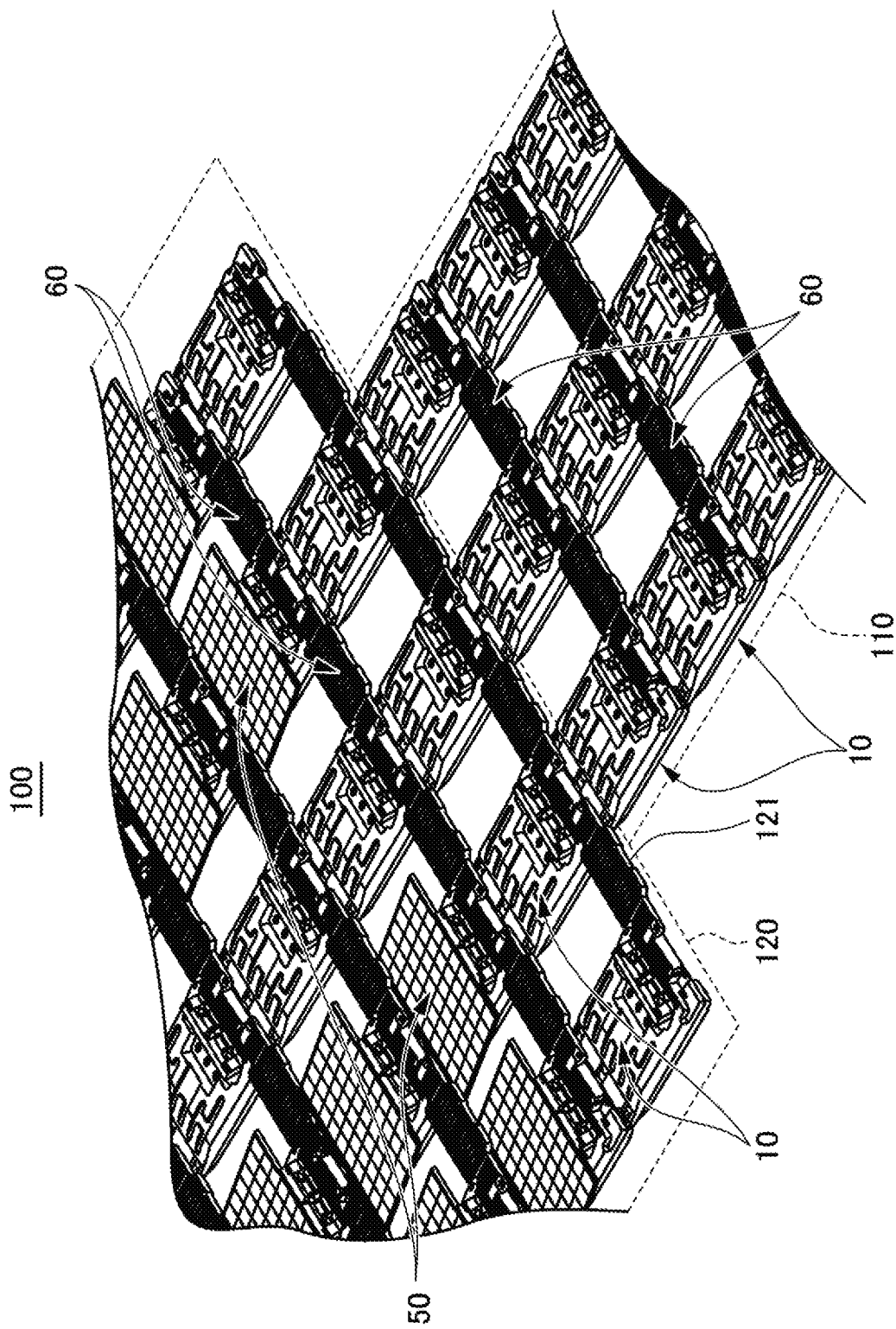
FIG. 15 is a diagram showing another example of the float assembly according to the embodiment of the present invention.

FIG. 15 is a diagram showing another example of the float assembly 100. In the float assembly 100 shown in FIG. 15, the connected float portion 130 is omitted and the pier 110 is directly connected to the float 10 of the assembly float portion 120. In the float assembly 100 shown in FIG. 15, the pier 110 is connected to a base end, of the float 10, which is provided in the assembly float portion 120 side.

In this case, the pier 110 mar have a plurality of the linear float portions (for example three or more) juxtaposed, and the adjacent linear float portions may be connected with the passage joint 60. Thereby, even if the stress is applied to the connection portion between the assembly float portion 120 and the pier 110, there is no problem.

Then, when installing the cable on this pier 110, it is preferable to place the cable along the center side of the pier 110 and use the end of the pier 110 as the passage. It prevents the cable from falling into the water.

Also, if the cable is laid out on one of the right and left sides of the pier 110, the balance of the pier 110 becomes worse and the pier 110 may be inclined to the side on which the cable is laid.

By laying heavier cable on the center side of the pier 110, it is possible to avoid inclining, and the worker can easily walk on pier 110.

Even in the case of the float assembly 100 having the connected float portion 130 shown in FIG. 14, the pier 110 may have a plurality of the linear float portions (for example, three or more) juxtaposed as shown in FIG. 15.

Figure 16:
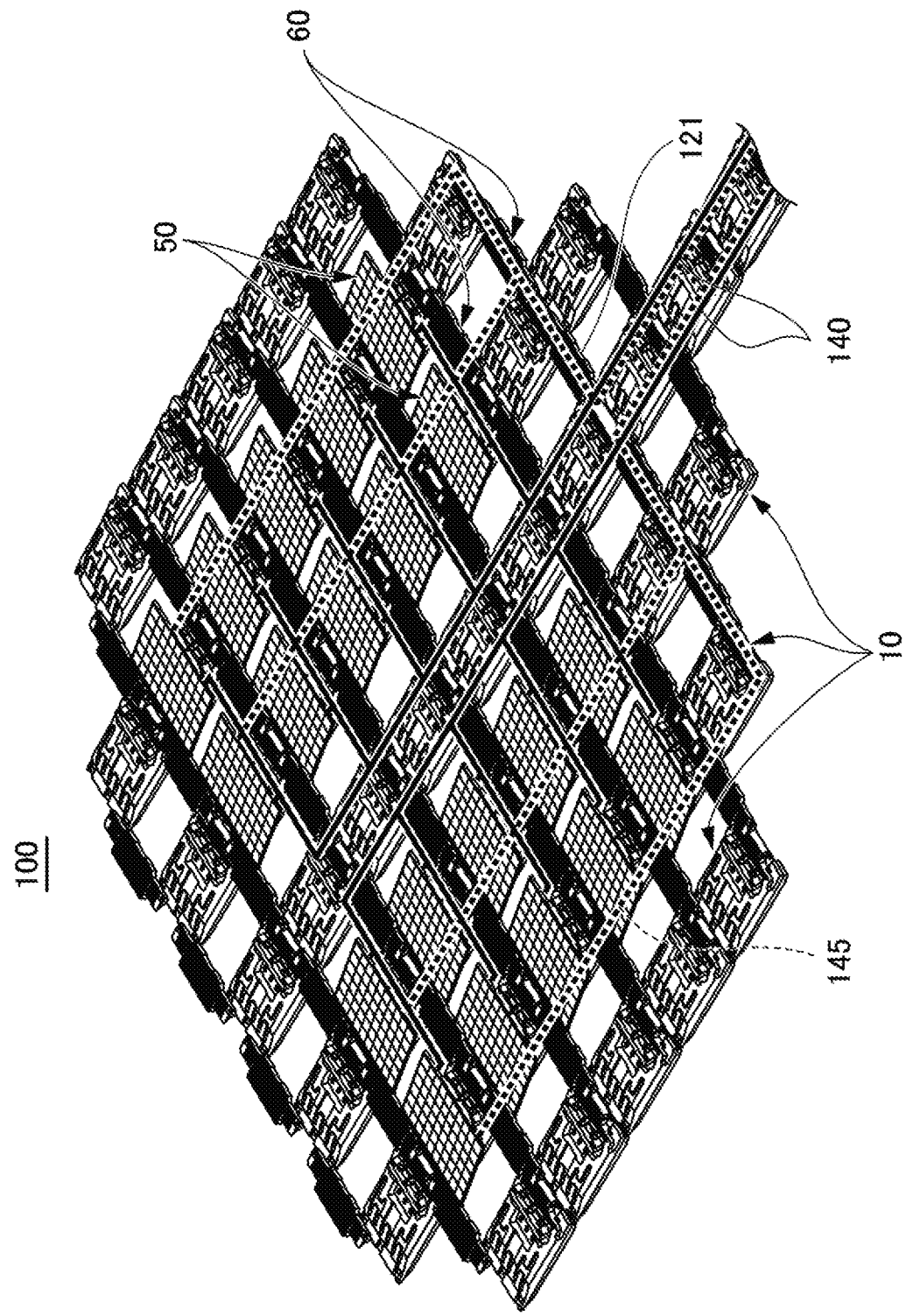
FIG. 16 is a diagram schematically showing a laying configuration of the cable.

By the way, for example, when schematically showing the cable CA (see FIG. 17) connected to the solar panel 50, it is as shown by a solid line 140 shown in FIG. 16.

On the other hand, there are cases where it is desired to be laid the cable CA (see FIG. 17), as indicated by a dotted line 145 shown in FIG. 16. In this case, how to pass the first side 52 (see FIGS. 1 and 2) side of the solar panel 50 is a technical problem.

Figure 17:
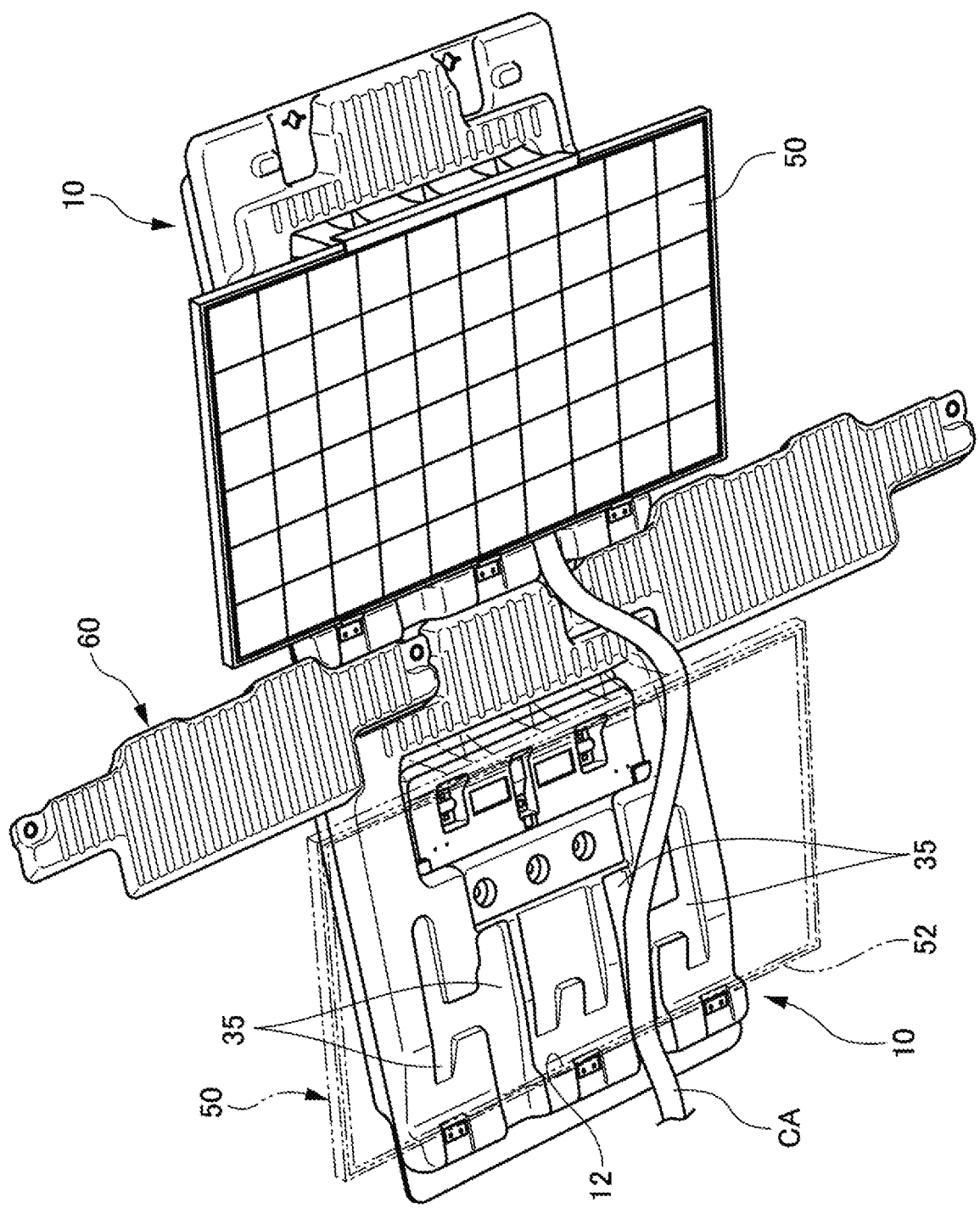
FIG. 17 is a view for explaining a modified embodiment of the float having a configuration adapted to the laying configuration of the cable.

Therefore, as will be described with reference to FIG. 17, it is preferable to provide a structure capable of facilitating the laying of the cable CA (see FIG. 17) as indicated by the dotted line 145 in FIG. 16 in the float 10. FIG. 17 illustrates a modification of the float 10 having a configuration adapted to the laying configuration of the cable CA (see FIG. 17) when laying the cable CA (see FIG. 17) like the dotted line 145 shown in FIG. 16.

In FIG. 17, a state, before the solar panel 50 is installed on the float 10 on the left side, is shown, but when the solar panel 50 is installed, it is indicated by a two-dot chain line.

In the modified example of the float 10 shown in FIG. 17, the depth of a pair of grooves 35, provided in the center side of the groove 35 shown in FIG. 3, is made deeper as shown in FIG. 17.

The groove 35 extends toward the other end so that the cable CA can pass through the receiving portion 12 which receives the first side 52 of the solar panel 50.

In this way, as schematically shown in FIG. 17, the worker can pass the cable CA of the solar panel 50 located in the float 10 on the right side through the underside of the solar panel 50 arranged in the float 10 on the left side. This makes it easy to deal with the laying of the cable CA as indicated by the dotted line 145 in FIG. 16.

In the case of laying of the cable CA such the dotted line 145, a portion of the cable CA other than laid at the passage joint 60 is located under the solar panel 50 and is hard to be exposed to rain. Thereby the deterioration of the cable CA can be suppressed. Also, since the cable CA surely passes over the float 10, it can be avoided that the cable CA falls into the water.

Although the present invention is described above based on specific embodiments, the present invention is not limited to the embodiments.

For example, the assembly float portion 120 may be provided with equipment other than the solar panel 50. The assembly float portion 120 may be provided with the power conditioner to which the cable CA connected to the solar panel 50 is connected. Also, the assembly float portion 120 may be laid a cable, connected to the power conditioner, extending to the land.

Also, it is preferable that the pier 110 is provided only close to the land the pier 110 may not directly fix to the land. In this way, the assembly float portion 120 can move in the same way when the pier 110 moves, so that damage to the pier 110 can be suppressed.

However, even when pier 110 is not fixed to land, pier 110 and the assembly float portion 120 do not necessarily have the same movement itself, because pier 110 and the assembly float portion 120 have different areas for receiving wind and different weights. Thus, it is preferable to provide the configuration capable of suppressing breakage of the pier 110 as described above.

On the contrary, if the pier 110 is in a state where it can freely move, stress is liable to be applied to the connection portion with the assembly float portion 120 instead.

Therefore, it is preferable to moor the mooring component such as the anchor rope to the float 10 used in the pier 110 so as to moor the appropriate position of the pier 110.

As described above, there is no need to cut the remaining three sides 21, 22, 23, leaving the side 24 as the hinge in order to raise the supporting portion 11 in the float 10 of the pier 110.

However, when the mooring component such as the anchor rope is moored to the float 10, the opening 26 needs to be formed. Therefore, as described above, when mooring the mooring components such as the anchor rope are moored on the float 10 of pier 100, it is preferable that only the sides 21, 22, 23, which are provided in the float 10 mooring the mooring component such as the anchor rope and provided with the pier 110, are cut.

And, except for the mooring work, it is preferable to close the opening 26 so that the worker can easily walk. As described with reference to FIG. 13, also for the float 10 of the pier 110 mooring the mooring component such as this anchor rope, it is preferable that the supporting portion 11 is provided with the second side metal fixture 13, the supporting portion 11 does not fall into the side of the back wall 17, and to the opening 26 is blocked.

Float Rotation

By the way, the passage joint 60 is joined to the float 10 on the upper surface of each float 10. Also, the float 10 is joined at a predetermined gap in the connecting direction of the passage joint 60. Therefore, the predetermined gap is formed between adjacent floats 10.

On the other hand, the connection in the direction orthogonal to the connecting direction of the passage joint 60 is realized by connecting eave-shaped end portions of the floats 10. When the float 10 is floated, the eave-shaped end portions is separated from the water surface.

Therefore, even in this direction (the direction orthogonal to the connecting direction of the passage joint 60), the gap is formed between each of the floats 10.

The float assembly 100 having the above structure is connected, in the predetermined connecting direction, to the passage joint 60 formed as a plastic molded body. In addition, the eave-shaped end portions of the float 10 are connected in the direction orthogonal to the predetermined connecting direction. Thus, both gaps are kept constant (invariable), and the resistance of the float assembly 100 to the water is always suppressed.

Also, in the float assembly 100, it is connected by the passage joint 60, and the gap between the floats 10 can be made large. As the gap between the floats 10 increases, the float assembly 100 becomes less susceptible to the influence of waves, and the inadvertent movement from the floating position is suppressed.

Normally, the float assembly 100 installs anchors so that the float assembly 100 does not move by waves, or the float assembly 100 is connected to land. Considering fluctuations in the tide level and the water volume before and after rainy weather, mooring has a margin.

If the float assembly 100 moves by waves due to this margin, the float assembly 100 can not track the sun as scheduled, the power generation efficiency decreases. However, the float assembly 100 has the large gaps between the floats 10, so the flow of water easily passes through the float assembly 100, and the float assembly 100 does not move inadvertently.

That is, as a modification, the float assembly 100 described above may track the sun. Since the float assembly 100 is floating on the water, it is possible to cause the float assembly 100 to be tracked by the sun by rotating the float assembly 100 with a small force as compared with the case where the float assembly 100 is installed on the ground.

Then, the rotation referred to here is a rotation in a broad sense and includes a change of the direction of the float assembly 100. Also, there is no regulation on the rotation angle and it is sufficient if it can receive the sun efficiently (at most about 180 degrees).

In addition, since the rotation of the float assembly 100 is performed during the daytime, it is not necessary to move it suddenly, and it is only necessary to move it by moment or at regular time intervals. Therefore, the wave-form resistance becomes negligibly small.

Also, the gaps are formed between the floats 10, so that water can pass therethrough. Therefore, when the float assembly 100 is rotated, the resistance of water can be weakened, and it becomes possible to rotate with the smaller force.

FIGS. 18A to 18E show a modified connection example of the pulling rope for rotating operation of the float assembly 100. The float assembly 100 floats in water and has low resistance to water. Therefore, the float assembly 100 can be rotated with the small force.

Figure 18A:
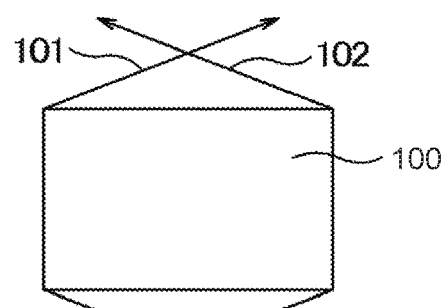
FIGS. 18A to 18E are schematic plan views showing a connection example of the pulling rope to the float assembly according to the modified embodiments.

For example, FIG. 18A shows an example in which the pulling ropes 101, 102, 103, 104 are connected to the four corners of the rectangular shaped float assembly 100 and the pulling ropes 101, 102 and the pulling rope 103, 104 are crossed on the long side.

In this case, when the pulling rope 101 and the pulling rope 103 are pulled, the float assembly 100 rotates in the clockwise direction. When the pulling rope 102 and the pulling rope 104 are pulled, the float assembly 100 rotates counterclockwise.

For example, turn the float assembly 100 by manipulating the pulling ropes 101-104 with the long side on the upper side in the figure facing north and the long side on the lower side facing the south. This makes it possible to track the solar panel 50 to the sun.

Figure 18B:
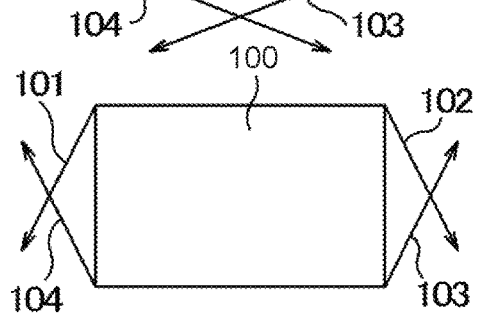

In FIG. 18B, the pulling ropes 101, 102, 103, 104 are connected to the four corners of the rectangular shaped float assembly 100, and the pulling ropes 101, 102 and the pulling ropes 103, 104 are crossed at the short sides.

When the pulling rope 101 and the pulling rope 103 are pulled, the float assembly 100 rotates counterclockwise. When the pulling rope 102 and the pulling rope 104 are pulled, the float assembly 100 rotates clockwise.

Figure 18C:
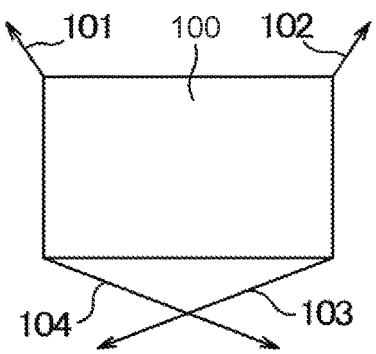

In FIG. 18C, the pulling ropes 101, 102, 103, 104 are connected to the four corners of the rectangular shaped float assembly 100, the pulling ropes 101 and 102 on one long side are pulled in opposite directions each other, and the pulling ropes 103 and 104 on the other long side are respectively crossed.

When the pulling rope 101 and the pulling rope 104 are pulled, the float assembly 100 rotates counterclockwise. When the pulling rope 102 and the pulling rope 103 are pulled, the float assembly 100 rotates clockwise.

Figure 18D:
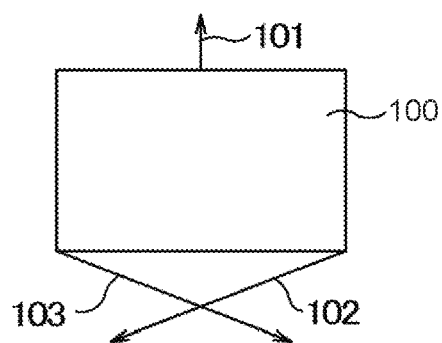
Figure 18E:
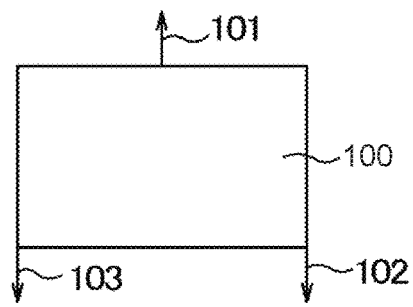

FIGS. 18D and 18E are examples in which the pulling rope is connected to three places of the float assembly 100.

In FIG. 18D, the pulling rope 101 is connected to the center of one long side of the rectangular shaped float assembly 100, and the pulling ropes 102 and 103 are connected to both ends of the other long side and crossed.

FIG. 18E shows the pulling rope 101 connected to the center of one long side of the rectangular shaped float assembly 100, and the pulling ropes 102 and 103 are connected to both ends of the other long side and pulled in the opposite direction to the pulling rope 101.

In either case, by pulling either pulling rope 102, 103 around the pulling rope 101 connected to the center of the long side, the float assembly 100 rotates clockwise or counterclockwise about the pulling rope 101 connected to the center of the long side.

In the photovoltaic power generation device of this embodiment, the sun is tracked only by pulling the float assembly 100 with less resistance to water with the pulling rope.

As equipment for solar tracking, only the pulling rope and the driving mechanism that pulls the pulling rope are required, and the force for rotation is also small, so the driving mechanism can be minimized. Therefore, it is unnecessary to make the apparatus large-scaled. In addition, a simple configuration can be achieved, and capital investment can be minimized.

In addition, since the force required for sun tracking can be small, power consumption is also minimized, coupled with the improvement in power generation efficiency by solar tracking, this embodiment significantly improve substantial power generation efficiency.

The present embodiment provides the resin float for the solar panel, and the resin float and the method of manufacturing the resin float for stably fixing the solar panel.

The present embodiment provides the resin float provided in the assembly float portion having high degree of mooring freedom for mooring the mooring component such as the anchor rope to the float and being capable of stably mooring the mooring component such as the anchor rope to the float.

The present embodiment provides the float assembly which makes the cable shorten and makes maintenance burden reduced.

While various embodiments of the present invention have been described, they have been presented by way of example and are not intended to limit the scope of the invention. The novel embodiments can be implemented in various other forms and various omissions, replacements, and modifications can be made without departing from the gist of the invention. Such embodiments and modifications thereof are included in the scope and gist of the invention and are included in the invention described in the claims and the equivalent scope thereof.

DESCRIPTION OF REFERENCE SIGNS

10: float
10a: first side
10b: second side
11: support portion,
11a: plane
12: receiving portion
13: second side metal fixture
13a: clamping portion
13b: fixing portion
13c: screw
14: first side metal fixture
14a: lower metal fixture
14aa: hook portion
14b: upper metal fixture
15: side wall
16: front wall
17: back wall
18: sloping portion
19: mounting portion
19a: nut accommodating portion
19aa: bottom portion
19ab: rasp-cut nut
19ac: screw
19b: peripheral wall 19c: first recess portion
19d: bottom portion
19e: second recess portion
19ea: bottom portion,
19f: recess
21, 22, 23, 24: side
22a: receiving rib
25: inner wall
26: opening
26a: edge
30: annular float portion
35: groove
40: recess
41, 42, 43: truncated conical recess portion
44,45: groove-shaped recess
50: solar panel
50a: glass portion
50b: outer periphery
51: second side
52: first side
53: base
54: base
55: frame
55a: panel receiving portion
55b: engaging portion
60: passage joint
60a: one end
60b: the other end
61: engaging protrusion
62: connecting bolt
62a: bolt hole
62b: bolt hole
63: bolt hole
70: mooring portion
71: first through hole
71a: taper portion
72: second through hole
80: eyebolt
80a: ring
80b: base portion
81: nut
82: first fixing portion
82a: through hole
83: first bolt,
84: first nut,
85: second fixing portion
90: stopper portion
91: finger insertion recess
100: float assembly
101-104: pulling rope
110: pier
120: assembly float portion
121: side
130: connected float portion
CA: cable
F: region
PL: parting line

The invention claimed is:
1. A resin float for a solar panel, comprising:
an annular float portion formed to be hollow, and
a recess including a peripheral wall provided in the annular float portion, wherein
the resin float comprises a back wall and a front wall,
the recess is formed by recessing the back wall toward a side of the front wall so that the recess is configured to accommodate air, and
at least a part of the back wall is integrated with the front wall in the recess,
the recess includes a plurality of first recesses and a second recess,
the second recess is arranged between the first recesses,
the second recess is connected to the first recesses in a direction in which the first recesses and the second recess are arranged,
the first recesses respectively include first tips in which the back wall is integrated with the front wall,
the second recess includes a second tip in which the back wall is not integrated with the front wall.
2. The resin float of claim 1, further comprising,
a supporting portion configured to support the solar panel, the supporting portion formed by combining the back wall and the front wall, wherein
the supporting portion is configured to be raised toward the side of the front wall with a side of the supporting portion as a hinge so as to form an opening of the annular float portion,
the side of the supporting portion being connected to an inner wall of the opening of the annular float portion, and
the recess is provided in a part of the annular float portion, the part of the annular float portion positioned on a side opposite to the supporting portion in a raised state, the part of the annular float portion sandwiching the opening of the annular float portion with the supporting portion.
3. The resin float of claim 2, wherein
the recess includes a plurality of second recesses,
each of the first recesses is a truncated conical recess portion which tapers toward the front wall, the first recesses are provided at both ends and a center of the recess along the supporting portion respectively, and
each of the second recesses is a groove-shaped recess portion which narrows toward the side of front wall, each of the second recesses is connected to the first recesses in the direction along the supporting portion.
4. The resin float of claim 1, wherein
the front wall includes
a sloping portion provided from a position adjacent to an end, opposite to an opening, of the recess toward a side away from the recess, the sloping portion being configured so that a distance to the back wall gradually decreases toward the side away from the recess,
a receiving portion configured to receive an end portion of the solar panel, the receiving portion provided to rise from an end, opposite to the recess, of the sloping portion.
5. The resin float of claim 4, wherein
the front wall is provided with a groove, the groove formed at least from a position in the recess to the sloping portion, and
a tip, on a side of the sloping portion, of the groove being connected to the sloping portion with substantially no step.
6. A resin float for a solar panel, comprising:
an annular float portion formed to be hollow,
a recess including a peripheral wall provided in the annular float portion,
a first side metal fixture configured to fix a first side of the solar panel, and a mounting portion provided in a first side of the annular float portion and having the first side metal fixture attached thereon, wherein the resin float comprises a back wall and a front wall, the recess is formed by recessing the back wall toward a side of the front wall so that the recess is configured to accommodate air, and at least a part of the back wall is integrated with the front wall in the recess, the first side metal fixture includes a lower metal fixture,
   a first side of the lower metal fixture is fixed to the mounting portion,
   at least a second side of the lower metal fixture is disposed under the solar panel, the lower metal fixture is engaged with or fixed to the solar panel.

7. The resin float of claim 6, further comprising:

a screw configured to fix the first side metal fixture to the mounting portion, wherein the first side metal fixture includes an upper metal fixture,
   a second side of the upper metal fixture is arranged above the solar panel and a first side of the upper metal fixture is fixed to the mounting portion, the second side of the upper metal fixture configured to clamp the solar panel between the upper metal fixture and the lower metal fixture so that the second side of the upper metal fixture presses the solar panel toward a side of the lower metal fixture, and the first side end side of the upper metal fixture and the first side of the lower metal fixture are fixed together to the mounting portion with the screw.

8. The resin float of claim 6, wherein the lower metal fixture having a second side provided with a U-shaped hook portion, the lower metal fixture is engaged with the solar panel by engaging the hook portion with an engaging portion provided in the solar panel.

9. A resin float for a solar panel, comprising:

an annular float portion formed to be hollow, a recess including a peripheral wall provided in the annular float portion, a receiving portion configured to receive a first side of the solar panel, the receiving portion provided in a first side of the resin float, and a mounting portion provided in the first side of the resin float, the mounting portion provided in a vicinity of the receiving portion, the mounting portion having the first side metal fixture attached thereon, wherein the resin float comprises a back wall and a front wall, the recess is formed by recessing the back wall toward a side of the front wall so that the recess is configured to accommodate air, and at least a part of the back wall is integrated with the front wall in the recess, the mounting portion includes
   a first recess portion including a peripheral wall portion, the first recess portion formed by recessing the back wall of the resin float toward a side of the front wall of the resin float, and
   a nut accommodating portion configured to accommodate and fix a nut, the nut accommodating portion formed by recessing the back wall toward the side of the front wall, a bottom portion of the nut accommodating portion is integrated with a bottom portion of the first recess portion.

10. The resin float of claim 9, further comprising:

a sloping portion provided in a first side of the resin float, the sloping portion being configured so that a distance between the front wall and the back wall gradually decreases in a direction from a second side of the sloping portion to a first side of the sloping portion, wherein the receiving portion is a rising wall portion rising from a first side of the sloping portion toward a direction in which the front wall is away from the back wall, the peripheral wall portion of the first recess portion is partly integrated with the rising wall portion.

11. The resin float of claim 9, wherein the mounting portion includes a pair of the nut accommodating portions which are spaced apart in a direction along the receiving portion, a second recess portion recessed from a bottom surface of the first recess portion, the second recess portion provided in a position between the pair of the nut accommodating portions and closer to the first side of the resin float than a line connecting the pair of the nut accommodating portions, a bottom portion of the second recess portion is integrated with the front wall.

12. The resin float of claim 9, wherein a plurality of the mounting portions are provided in a direction along the receiving portion.

\* \* \* \* \*